US010228757B2

(12) United States Patent
Nishizawa et al.

(10) Patent No.: US 10,228,757 B2
(45) Date of Patent: Mar. 12, 2019

(54) DISPLAY DEVICE, CONTROL METHOD FOR DISPLAY DEVICE, AND COMPUTER PROGRAM

(71) Applicant: SEIKO EPSON CORPORATION, Tokyo (JP)

(72) Inventors: Kazuo Nishizawa, Matsumoto (JP); Masahide Takano, Matsumoto (JP); Teruhito Kojima, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/130,281

(22) Filed: Apr. 15, 2016

(65) Prior Publication Data

US 2017/0010662 A1    Jan. 12, 2017

(30) Foreign Application Priority Data

Jul. 7, 2015   (JP) ................................. 2015-135738
Jan. 27, 2016  (JP) ................................. 2016-013249

(51) Int. Cl.
| | |
|---|---|
| *G06F 3/01* | (2006.01) |
| *G06F 3/16* | (2006.01) |
| *G02B 27/01* | (2006.01) |
| *H04B 5/00* | (2006.01) |
| *H04W 4/80* | (2018.01) |

(52) U.S. Cl.
CPC .......... *G06F 3/011* (2013.01); *G02B 27/0172* (2013.01); *G06F 3/017* (2013.01); *G06F 3/167* (2013.01); *H04B 5/0031* (2013.01); *H04W 4/80* (2018.02); *G02B 2027/014* (2013.01); *G02B 2027/0138* (2013.01)

(58) Field of Classification Search
CPC .......... G06F 3/011; G06F 3/017; G06F 3/167; G02B 27/0172; G02B 2027/0138; G02B 2027/014; H04B 5/0031
See application file for complete search history.

(56) References Cited

U.S. PATENT DOCUMENTS

| | | | | |
|---|---|---|---|---|
| 2002/0154166 | A1* | 10/2002 | Sanders ................ | G06F 3/0482 715/764 |
| 2003/0085881 | A1* | 5/2003 | Bosma .................. | G06F 3/0481 345/173 |
| 2004/0001109 | A1* | 1/2004 | Blancett ............... | G06F 3/0482 715/843 |
| 2004/0196316 | A1* | 10/2004 | Handy Bosma ...... | G06F 3/0486 715/821 |
| 2004/0227817 | A1* | 11/2004 | Oya ....................... | G06F 3/017 348/155 |
| 2006/0256082 | A1* | 11/2006 | Cho ...................... | G06F 1/1626 345/156 |

(Continued)

FOREIGN PATENT DOCUMENTS

JP    2013-029985 A    2/2013

*Primary Examiner* — Sejoon Ahn
(74) *Attorney, Agent, or Firm* — Oliff PLC

(57) ABSTRACT

An HMD includes an image display section configured to display an image to be visually recognizable through an outside scene. The HMD includes a position detecting section configured to recognize an input and a control section configured to cause the image display section to display information and change the display in the image display section according to the input recognized by the position detecting section.

19 Claims, 14 Drawing Sheets

(56) References Cited

U.S. PATENT DOCUMENTS

| | | | |
|---|---|---|---|
| 2007/0296646 A1* | 12/2007 | Yamamoto | G02B 27/017 345/8 |
| 2010/0222181 A1* | 9/2010 | Shea | A63B 24/0062 482/8 |
| 2012/0075168 A1* | 3/2012 | Osterhout | G02B 27/017 345/8 |
| 2012/0133579 A1* | 5/2012 | Prieur | G06F 3/017 345/156 |
| 2013/0050258 A1* | 2/2013 | Liu | G02B 27/017 345/633 |
| 2013/0222271 A1* | 8/2013 | Alberth | G06F 1/163 345/173 |
| 2014/0002372 A1* | 1/2014 | Oksman | G06F 3/0488 345/173 |
| 2014/0053102 A1* | 2/2014 | Lee | G06F 3/0482 715/810 |
| 2014/0181715 A1* | 6/2014 | Axelrod | G06F 3/0487 715/771 |
| 2014/0189520 A1* | 7/2014 | Crepps | G06F 3/0484 715/738 |
| 2014/0198190 A1* | 7/2014 | Okumu | G02B 27/017 348/53 |
| 2014/0247279 A1* | 9/2014 | Nicholas | G06F 19/006 345/633 |
| 2014/0267010 A1* | 9/2014 | Pasquero | G06T 19/006 345/156 |
| 2014/0282076 A1* | 9/2014 | Fischer | G06F 3/0484 715/751 |
| 2014/0282257 A1* | 9/2014 | Nixon | G05B 11/01 715/835 |
| 2014/0330408 A1* | 11/2014 | Rolley | G06F 19/3481 700/91 |
| 2015/0099477 A1* | 4/2015 | Sato | H04W 64/006 455/90.1 |
| 2015/0302334 A1* | 10/2015 | Thomas | G06F 3/0484 705/7.26 |
| 2015/0375040 A1* | 12/2015 | Sigal | A63B 24/0059 482/4 |
| 2016/0012154 A1* | 1/2016 | Ikejima | G06F 3/0484 707/798 |
| 2016/0357384 A1* | 12/2016 | Khalid | G06F 3/0488 |
| 2017/0011329 A1* | 1/2017 | Tokuoka | G06F 3/0481 |

* cited by examiner

123e

| STANDARD OPERATION MANUAL ||||
|---|---|---|---|
| ORDER | WORK CONTENT | TARGET | FLAG |
| WORK 1. | BEARING CLEANING | BEARING | COMPLETED |
| WORK 2. | OIL SEAL DETACHMENT | OIL SEAL | COMPLETED |
| WORK 3. | GREASE REMOVAL | BALLS | |
| WORK 4. | GREASE FILLING | BALLS | |
| WORK 5. | OIL SEAL ATTACHMENT | OIL SEAL | |

| DISPLAY SETTING ||
|---|---|
| DISPLAY TYPE | DISPLAY FORM |
| TARGET BEFORE WORK | LOW LUMINANCE / LIGHT COLOR |
| TARGET DURING WORK | LIGHT COLOR |
| TARGET OF IMPORTANT WORK | HIGH LUMINANCE / DARK COLOR |
| TARGET FOR WHICH WORK HAS BEEN COMPLETED | LOW LUMINANCE / DARK COLOR |

FIG. 8B

DISPLAY DEVICE, CONTROL METHOD FOR DISPLAY DEVICE, AND COMPUTER PROGRAM

BACKGROUND

1. Technical Field

The invention relates to a display device, a control method for the display device, and a computer program.

2. Related Art

There has been known a method of supporting execution of a work procedure according to a scenario including information concerning the work procedure (see, for example, JP-A-2013-29985 (Patent Literature 1)). In the method described in Patent Literature 1, a work list or the like is displayed according to a scenario including an action sequence concerning details of the work procedure to support the execution of the work procedure. An execution state is displayed on a screen.

In the method described in Patent Literature 1, an operator performs work viewing the screen on which the work list or the like is displayed. In this case, the operator needs to view both of a place or a target object, which is a target of the work, and the screen. When information related to a motion of a person who performs the motion targeting the place or the object is shown to the person, the person (e.g., an operator) has to, for example, move a visual line in order to view the place or the object, which is the target of the motion, and the information related to the motion. Therefore, there is a demand for a method capable of easily showing, when the person performs the motion targeting the place or the object, the information concerning the motion to the person.

SUMMARY

An advantage of some aspects of the invention is to easily show information concerning a motion to a person who performs the motion targeting a place or an object.

A display device according to an aspect of the invention includes: a display section configured to display an image to be visually recognizable through an outside scene; an input section configured to recognize an input; and a control section configured to cause the display section to display information and change the display in the display section according to the input recognized by the input section.

According to the aspect, a person viewing the display device can change the display by viewing the displayed information and performing an input recognizable by the input section. Consequently, a person who performs a motion targeting a place or an object can visually recognize the place or the object, which is the target of the motion, through the display section and view, for example, information concerning the motion in this state. In this way, the person can view the target present in a real space, which is an outside scene, and the information together even if the person does not perform a movement with a large load such as a large movement of a visual line. Since the display is changed according to the input, it is possible to sequentially provide new information by, for example, changing the display according to the progress of the motion.

In the display device according to the aspect, the control section may cause the display section to display the item as the information on the basis of item data including an item.

According to the aspect with this configuration, it is possible to display various numbers and various types of items.

In the display device according to the aspect, the item data may include a plurality of the items corresponding to motions, and, in the respective items, order of the item corresponding to execution order of the motions may be set.

According to the aspect with this configuration, it is possible to inform, with a display form of the item, the person viewing the display device of the execution order of the motion.

In the display device according to the aspect, the control section may arrange the plurality of items in a list format and cause the display section to display the plurality of items, and the item may be arranged according to the order set for the item.

According to the aspect with this configuration, it is possible to inform, with the arrangement of the displayed plurality of items, the person viewing the display device of the execution order of the motion.

In the display device according to the aspect, the control section may cause the display section to sequentially display the item in the order set for the item.

According to the aspect with this configuration, it is possible to inform, with the display order of the item, the person viewing the display device of the execution order of the motion.

In the display device according to the aspect, the control section may display, in association with the item, a checkbox indicating completion of the motion corresponding to the item and, after sequentially displaying the item in the order set for the item, when detecting the completion of the motion corresponding to the item, change a display state of the checkbox to a state indicating the motion completion.

According to the aspect with this configuration, when informing the person of the execution order of the motion with the display order of the item, it is possible to clearly inform the person of the completed motion and clearly show a progress situation of the motion.

In the display device according to the aspect, the control section may cause the display section to display an image on the basis of order data including information concerning the execution order of the motion corresponding to the item included in the item data.

According to the aspect with this configuration, it is possible to inform, with the image, the person viewing the display device of the execution order of the motion.

In the display device according to the aspect, the display device may further include an order-data storing section configured to store the item data and the order data in association with each other.

According to the aspect with this configuration, it is possible to easily read out and use the data concerning the item concerning the motion and the data concerning the execution order of the motion.

In the display device according to the aspect, the control section may cause the display section to display the information related to a target selected from an object in a real space visually recognized through the display section in a display form corresponding to the target.

According to the aspect with this configuration, it is possible to show the information concerning the object in the real space visually recognized through the display section to the person viewing the display device as if the information corresponds to the object in the real space.

In the display device according to the aspect, the control section may cause the display section to display the information for highlighting the target in the real space visually recognized through the display section to be superimposed on the target.

According to the aspect with this configuration, it is possible to show the object in the real space to the person viewing the display device while highlighting the object.

In the display device according to the aspect, the control section may switch, according to the input recognized by the input section, the information displayed in the display form corresponding to the target to the information corresponding to a target different from the target and display the information.

According to the aspect with this configuration, it is possible to change the target, the information of which is displayed, according to the input and switch and display the information. Therefore, it is possible to sequentially display different information corresponding to a different target.

In the display device according to the aspect, the input section may detect an input in a range visually recognized through the display section and specify an input position, and the control section may change the display in the display section according to the input position specified by the input section.

According to the aspect with this configuration, when the input recognizable by the input section is performed, it is possible to change the display according to the input position.

In the display device according to the aspect, the control section may cause the display section to display an indicator to be superimposed on the item being displayed in a position corresponding to the input position specified by the input section.

According to the aspect with this configuration, it is possible to change, by performing the input, a display form of an item to be displayed.

In the display device according to the aspect, the display device may further include a state detecting section configured to detect an execution state of the motion corresponding to the item on the basis of a picked-up image of the outside scene or voice collected from the outside scene, and the control section may change, according to the execution state detected by the state detecting section, a display state of the item being displayed by the display section.

According to the aspect with this configuration, it is possible to detect the execution state of the motion and change the display state according to the detected execution state.

In the display device according to the aspect, the display device may further include an execution-data storing section configured to store execution data including information related to the execution state of the motion, and the control section may cause the execution-data storing section to store, in association with the item data, execution data of the motion corresponding to the item included in the item data and, when the execution data is read out from the execution-data storing section, control, on the basis of the read-out execution data, the display state of the item displayed by the display section.

According to the aspect with this configuration, by storing data concerning the execution state of the motion and reading out the data and reflecting the data on display, it is possible to perform recording concerning the execution state and readout of the recorded execution state.

In the display device according to the aspect, the display device may further include a target detecting section configured to detect a target in the outside scene, and the control section may cause the display section to display the item included in the item data to correspond to a position where the target detected by the target detecting section is visually recognized through the display section.

According to the aspect with this configuration, it is possible to easily visually recognize both of the place or the object, which is the target of the motion, and the item.

In the display device according to the aspect, the display device may further include a communication section configured to communicate with an external apparatus and receive and acquire, with the communication section, the item data from the external apparatus.

According to the aspect with this configuration, it is possible to acquire the data concerning the item from the outside.

In the display device according to the aspect, the communication section may execute near field radio communication.

According to the aspect with this configuration, it is possible to acquire the data concerning the item from the outside through the near field radio communication. Since a distance in which the near field radio communication can be performed is limited, it is possible to acquire data associated with a place.

A control method for a control device according to another aspect of the invention includes a display section configured to display an image to be visually recognizable through an outside scene, the control method including: acquiring data of a list including a plurality of items; detecting an input in a range visually recognized through the display section and specifying an input position; and causing, on the basis of item data including an item, the display section to display the item and change a display state of the item being displayed in a position corresponding to the specified input position.

According to the aspect, a person viewing the display device can change the display of the item by viewing an item to be displayed and performing an input recognizable by the input section. Consequently, for example, a person who performs a motion targeting a place or an object can view the item with the display section and visually recognize the place or the object, which is the target of the motion, through the display section. In this way, the person can view the target present in a real space, which is an outside scene, and the item even if the person does not perform a movement with a large load such as a large movement of a visual line and can change the display.

A computer program according to still another aspect of the invention is executable by a computer that controls a display device including a display section configured to display an image to be visually recognizable through an outside scene, the computer program causing the computer to: detect an input in a range visually recognized through the display section and specify an input position; and cause, on the basis of item data including an item, the display section to display the item and change a display state of the item being displayed in a position corresponding to the specified input position.

A storage medium according to yet another aspect of the invention has the computer program stored therein.

BRIEF DESCRIPTION OF THE DRAWINGS

The invention will be described with reference to the accompanying drawings, wherein like numbers reference like elements.

FIG. 8A is a schematic diagram showing another configuration example of the data stored by the storing section and shows a configuration example of scenario data.

FIG. 8B is a schematic diagram showing another configuration example of the data stored by the storing section and shows a configuration example of display setting data.

DESCRIPTION OF EXEMPLARY EMBODIMENTS

First Embodiment

Figure 1:
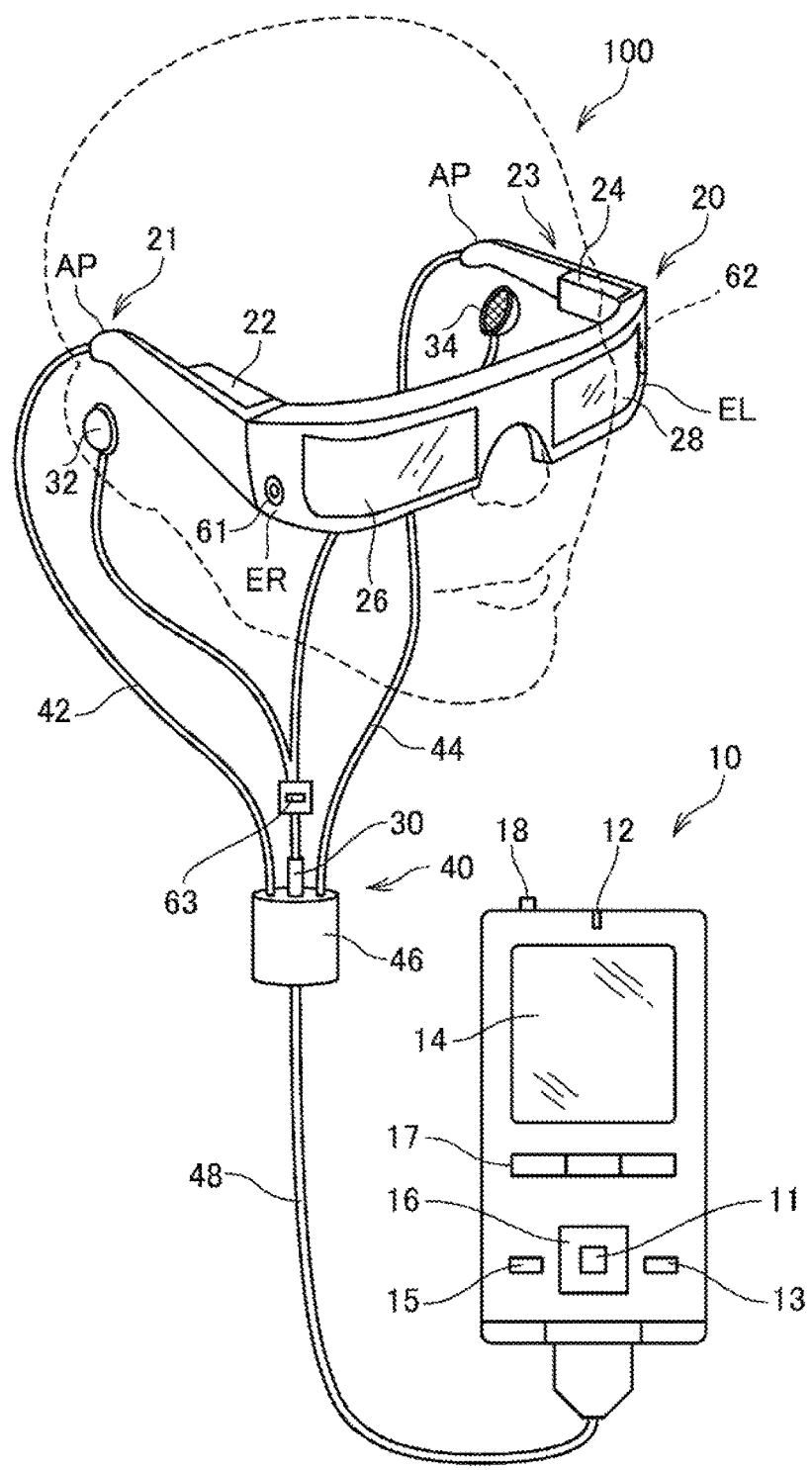
FIG. 1 is an explanatory diagram showing the exterior configuration of an HMD in a first embodiment.

FIG. 1 is an explanatory diagram showing the exterior configuration of an HMD (Head Mounted Display) 100 according to an embodiment applied with the invention.

The HMD 100 is a display device including an image display section 20 that causes a user to visually recognize a virtual image in a state in which the image display section 20 is worn on the head of the user and a control device 10 that controls the image display section 20. The control device 10 also functions as a controller with which the user controls the HMD 100.

The image display section 20 is a wearing body worn on the head of the user. In this embodiment, the image display section 20 has an eyeglass shape. The image display section 20 includes a right holding section 21, a right display driving section 22, a left holding section 23, a left display driving section 24, a right optical-image display section 26, a left optical-image display section 28, a right camera 61 (an image pickup section), a left camera 62 (an image pickup section), and a microphone 63. The right optical-image display section 26 and the left optical-image display section 28 are disposed to be respectively located in front of the right eye and in front of the left eye of the user when the user wears the image display section 20. One end of the right optical-image display section 26 and one end of the left optical-image display section 28 are connected to each other in a position corresponding to the middle of the forehead of the user when the user wears the image display section 20.

The right holding section 21 is a member provided to extend from an end portion ER, which is the other end of the right optical-image display section 26, to a position corresponding to the temporal region of the user when the user wears the image display section 20. Similarly, the left holding section 23 is a member provided to extend from an end portion EL, which is the other end of the left optical-image display section 28, to a position corresponding to the temporal region of the user when the user wears the image display section 20. The right holding section 21 and the left holding section 23 hold the image display section 20 on the head of the user like temples of eyeglasses.

The right display driving section 22 and the left display driving section 24 are disposed on sides opposed to the head of the user when the user wears the image display section 20. Note that, in the following explanation, the right display driving section 22 and the left display driving section 24 are collectively simply referred to as "display driving sections" as well and the right optical-image display section 26 and the left optical-image display section 28 are collectively simply referred to as "optical-image display sections" as well.

The display driving sections 22 and 24 include liquid crystal displays 241 and 242 (hereinafter referred to as "LCDs 241 and 242" as well) and projection optical systems 251 and 252 explained below with reference to FIGS. 2 to 4.

The right optical-image display section 26 and the left optical-image display section 28 include light guide plates 261 and 262 (FIG. 2) and dimming plates 20A. The light guide plates 261 and 262 are formed of a light transmissive resin or the like and guide image lights output by the display driving sections 22 and 24 to the eyes of the user. The dimming plates 20A are thin plate-like optical elements and are arranged to cover the front side of the image display section 20 on the opposite side of the side of the eyes of the user. As the dimming plates 20A, various dimming plates such as a dimming plate having almost no light transmissivity, a dimming plate nearly transparent, a dimming plate that attenuates a light amount and transmits light, and a dimming plate that attenuates or reflects light having a specific wavelength can be used. By selecting optical characteristics (light transmittance, etc.) of the dimming plates 20A as appropriate, it is possible to adjust an amount of external light made incident on the right optical-image display section 26 and the left optical-image display section 28 from the outside and adjust easiness of visual recognition of a virtual image. In this embodiment, the dimming plates 20A at least having light transmissivity enough for enabling the user wearing the HMD 100 to visually recognize an outside scene are used. The dimming plates 20A protect the right light guide plate 261 and the left light guide plate 262 and suppress damage, adhesion of stain, and the like to the right light guide plate 261 and the left light guide plate 262.

The dimming plates 20A may be detachably attachable to the right optical-image display section 26 and the left optical-image display section 28. A plurality of kinds of dimming plates 20A may be replaceable and attachable. The dimming plates 20A may be omitted.

The right camera 61 is disposed at the end portion on the right holding section 21 side on the front surface of the HMD 100. The left camera 62 is disposed at the end portion on the left holding section 23 side on the front surface of the HMD 100. The right camera 61 and the left camera 62 are digital cameras including image pickup devices such as CCDs or CMOSs and image pickup lenses. The right camera 61 and the left camera 62 may be a monocular camera or may be a stereo camera.

The right camera 61 and the left camera 62 pick up images of at least a part of an outside scene in a front side direction of the HMD 100, in other words, in a visual field direction of the user in a state in which the HMD 100 is mounted. In another expression, at least one of the right camera 61 and the left camera 62 picks up an image in a range or direction overlapping a visual field of the user. More specifically, at least one of the right camera 61 and the left camera 62 picks up an image in a direction gazed by the user. The breadth of angles of view of the right camera 61 and the left camera 62 can be set as appropriate. In this embodiment, as explained below, the angles of view of the right camera 61 and the left camera 62 are angles of view including an outside world that the user visually recognizes through the right optical-image display section 26 and the left optical-image display section 28. Further, it is more desirable that an image pickup range of the right camera 61 and the left camera 62 is set such that the right camera 61 and the left camera 62 can pick up an image of the entire visual field of the user through the dimming plates 20A.

The right camera 61 and the left camera 62 execute image pickup according to control by an image-pickup control section 161 (FIG. 4) included in a control section 140 and output picked-up image data to the image-pickup control section 161.

The HMD 100 may include a distance sensor (not shown in the figure) that detects a distance to a measurement target object located in a measurement direction set in advance. The distance sensor is disposed in, for example, a boundary portion between the right optical-image display section 26 and the left optical-image display section 28. In this case, in a state in which the user wears the image display section 20, the position of the distance sensor is substantially the middle of both the eyes of the user in the horizontal direction and is above both the eyes of the user in the vertical direction. The measurement direction of the distance sensor can be set in, for example, a direction overlapping an image pickup direction of the right camera 61 and the left camera 62 in the front side direction of the HMD 100.

The distance sensor can include a light source such as an LED or a laser diode and a light receiving section that receives reflected light of light emitted by the light source and reflected on a measurement target object. The distance sensor only has to execute triangular range finding processing and range finding processing based on a time difference according to control by the control section 140. The distance sensor may include a sound source that emits ultrasound and a detecting section that receives the ultrasound reflected on the measurement target object. In this case, the distance sensor only has to execute the range finding processing on the basis of a time difference until the reflection of the ultrasound according to the control by the control section 140.

Figure 2:
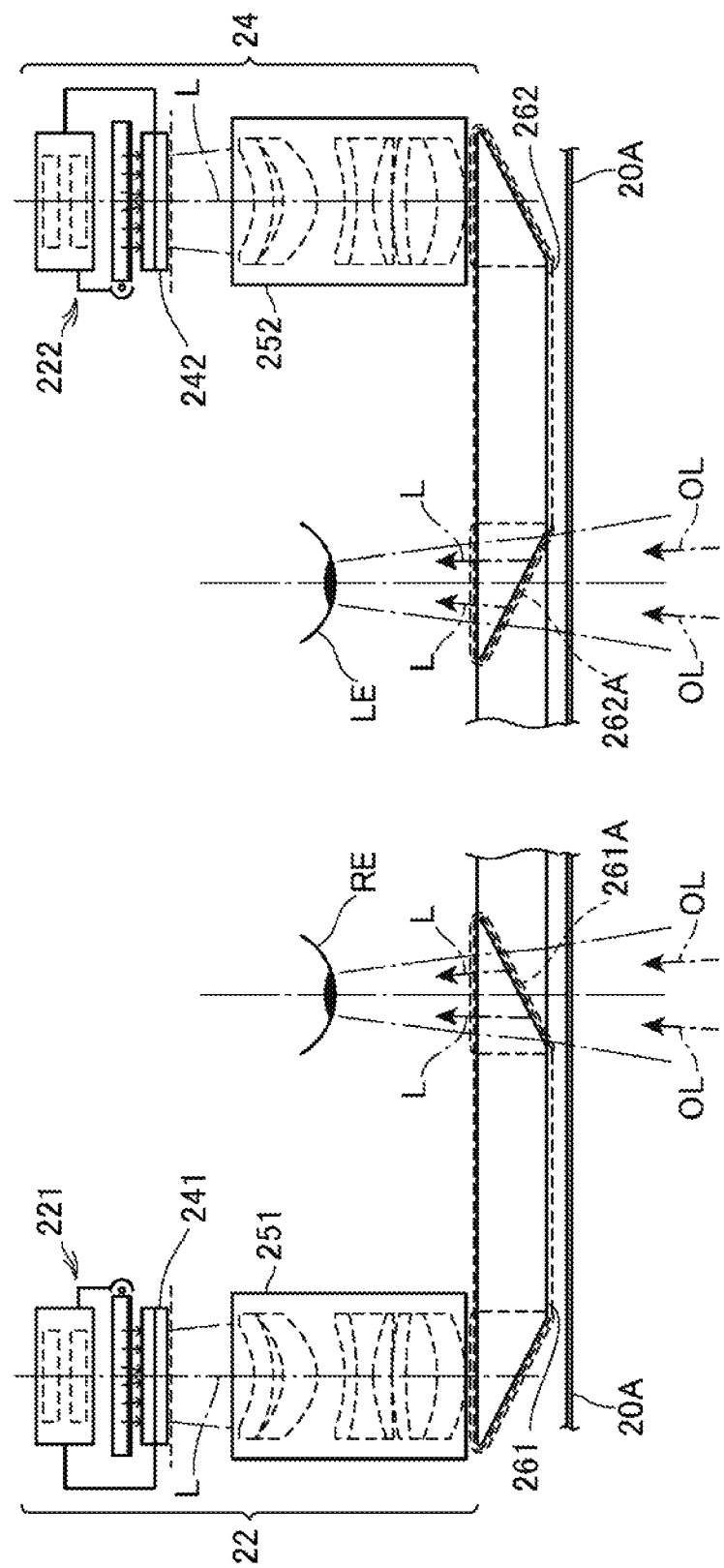
FIG. 2 is a diagram showing the configuration of optical systems of an image display section.

FIG. 2 is a main part plan view showing the configuration of optical systems included in the image display section 20. A left eye LE and a right eye RE of the user are shown in FIG. 2 for explanation.

The left display driving section 24 includes a left backlight 222 including a light source such as an LED and a diffuser, the left LCD 242 of a transmission type disposed on an optical path of light diffused by the diffuser of the left backlight 222, and a left projection optical system 252 including a lens group that guides image light L transmitted through the left LCD 242. The left LCD 242 is a transmission-type liquid crystal panel on which a plurality of pixels are arranged in a matrix shape.

The left projection optical system 252 includes a collimate lens that changes the image light L emitted from the left LCD 242 to light beams in a parallel state. The image light L changed to the light beams in the parallel state by the collimate lens is made incident on the left light guide plate 262. The left light guide plate 262 is a prism on which a plurality of reflection surfaces for reflecting the image light L are formed. The image light L is guided to the left eye LE side through a plurality of times of reflection on the inside of the left light guide plate 262. On the left light guide plate 262, a half mirror 262A (a reflection surface) located in front of the left eye LE is formed.

The image light L reflected on the half mirror 262A is emitted from the left optical-image display section 28 toward the left eye LE. The image light L forms an image on the retina of the left eye LE and causes the user to visually recognize the image.

The right display driving section 22 is configured symmetrically to the left display driving section 24. The right display driving section 22 includes a right backlight 221 including a light source such as an LED and a diffuser, the right LCD 241 of the transmission type disposed on an optical path of light diffused from the diffuser of the right backlight 221, and the right projection optical system 251 including a lens group that guides the image light L transmitted through the right LCD 241. The right LCD 241 is a transmission-type liquid crystal panel on which a plurality of pixels are arranged in a matrix shape.

The right projection optical system 251 includes a collimate lens that changes the image light L emitted from the right LCD 241 to light beams in a parallel state. The image light L changed to the light beams in the parallel state by the collimate lens is made incident on the right light guide plate 261 (an optical element). The right light guide plate 261 is a prism on which a plurality of reflection surfaces for reflecting the image light L are formed. The image light L is guided to the right eye RE side through a plurality of times of reflection on the inside of the right light guide plate 261. On the right light guide plate 261, a half mirror 261A (a reflection surface) located in front of the right eye RE is formed.

The image light L reflected on the half mirror 261A is emitted from the right optical-image display section 26 toward the right eye RE. The image light L forms an image on the retina of the right eye RE and causes the user to visually recognize the image.

The image light L reflected on the half mirror 261A and external light OL transmitted through the dimming plate 20A are made incident on the right eye RE of the user. The image light L reflected on the half mirror 262A and the external light OL transmitted through the dimming plate 20A are made incident on the left eye LE. In this way, the HMD 100 makes the image light L of the image processed on the inside and the external light OL incident on the eyes of the user to be superimposed one on top of the other. For the user, the outside scene is seen through the dimming plates 20A. The image formed by the image light L is visually recognized to be superimposed the outside scene. In this way, the HMD 100 functions as a see-through type display device.

Note that the left projection optical system 252 and the left light guide plate 262 are collectively referred to as "left light guide section" as well. The right projection optical system 251 and the right light guide plate 261 are collectively referred to as "right light guide section" as well. The configuration of the right light guide section and the left light guide section is not limited to the example explained above. Any system can be used as long as a virtual image is formed in front of the eyes of the user using image light. For example, a diffraction grating may be used or a transreflective film may be used.

The image display section 20 is connected to the control device 10 via a connecting section 40. The connecting section 40 includes a main body cord 48 connected to the control device 10, a right cord 42, a left cord 44, and a coupling member 46. The right cord 42 and the left cord 44 are two cords branching from the main body cord 48. The right cord 42 is inserted into a housing of the right holding section 21 from a distal end portion AP in an extending direction of the right holding section 21 and connected to the right display driving section 22. Similarly, the left cord 44 is inserted into a housing of the left holding section 23 from a distal end portion AP in an extending direction of the left holding section 23 and connected to the left display driving section 24.

The coupling member 46 is provided at a branching point of the main body cord 48 and the right and left cords 42 and 44 and includes a jack for connecting an earphone plug 30. A right earphone 32 and a left earphone 34 extend from the earphone plug 30. The microphone 63 is provided in the vicinity of the earphone plug 30. Cords between the earphone plug 30 and the microphone 63 are collected as one cord. Cords branch from the microphone 63 and are respectively connected to the right earphone 32 and the left earphone 34.

For example, as shown in FIG. 1, the microphone 63 is disposed to direct a sound collecting section of the microphone 63 to the visual line direction of the user. The microphone 63 collects sound and outputs a sound signal to a sound processing section 187 (FIG. 4). The microphone 63 may be, for example, a monaural microphone or a stereo microphone, may be a microphone having directivity, or may be a nondirectional microphone.

The right cord 42, the left cord 44, and the main body cord 48 only have to be cords capable of transmitting digital data and can be configured by, for example, a metal cable or an optical fiber. The right cord 42 and the left cord 44 may be collected as one cord.

The image display section 20 and the control device 10 transmit various signals via the connecting section 40. Connectors (not shown in the figure), which fit with each other, are provided at an end of the main body cord 48 on the opposite side of the coupling member 46 and in the control device 10. The control device 10 and the image display section 20 can be connected and disconnected by fitting and unfitting of the connector of the main body cord 48 and the connector of the control device 10.

The control device 10 controls the HMD 100. The control device 10 includes a determination key 11, a lighting section 12, a display switching key 13, a luminance switching key 15, a direction key 16, a menu key 17, and switches including a power switch 18. The control device 10 also includes a track pad 14 operated by the user with fingers.

The determination key 11 detects pressing operation and outputs a signal for determining content of the operation in the control device 10. The lighting section 12 includes a light source such as an LED (Light Emitting Diode) and notifies, with a lighting state of the light source, an operation state of the HMD 100 (e.g., ON/OFF of a power supply). The display switching key 13 outputs, according to pressing operation, for example, a signal for instructing switching of a display mode of an image.

The track pad 14 includes an operation surface for detecting contact operation and outputs an operation signal according to operation on the operation surface. A detection type on the operation surface is not limited. An electrostatic type, a pressure detection type, an optical type, and the like can be adopted. The luminance switching key 15 outputs, according to pressing operation, a signal for instructing an increase and a decrease in the luminance of the image display section 20. The direction key 16 outputs an operation signal according to pressing operation on keys corresponding to the upward, downward, left, and right directions. The power switch 18 is a switch that switches power ON/OFF of the HMD 100.

Figure 3A:
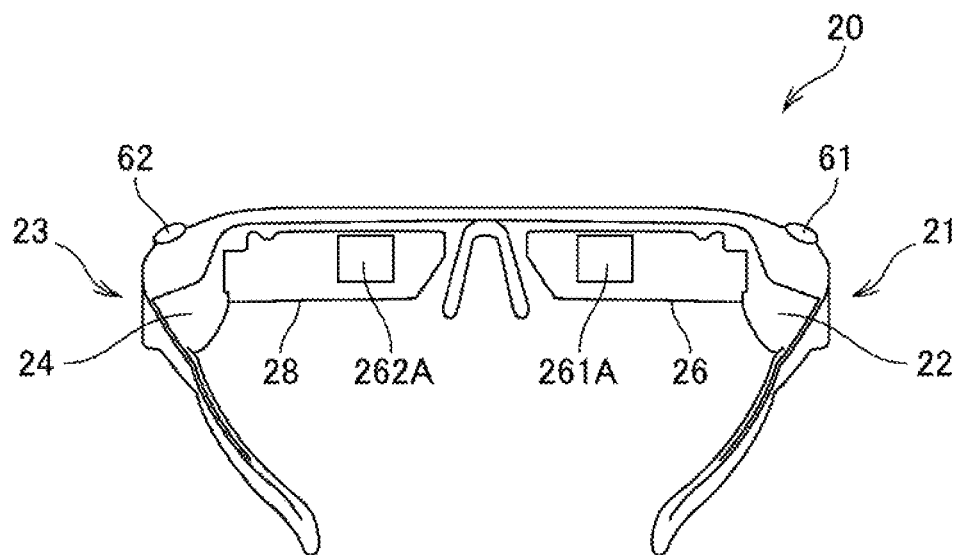
FIGS. 3A and 3B are diagrams showing the main part configuration of the image display section.
Figure 3B:
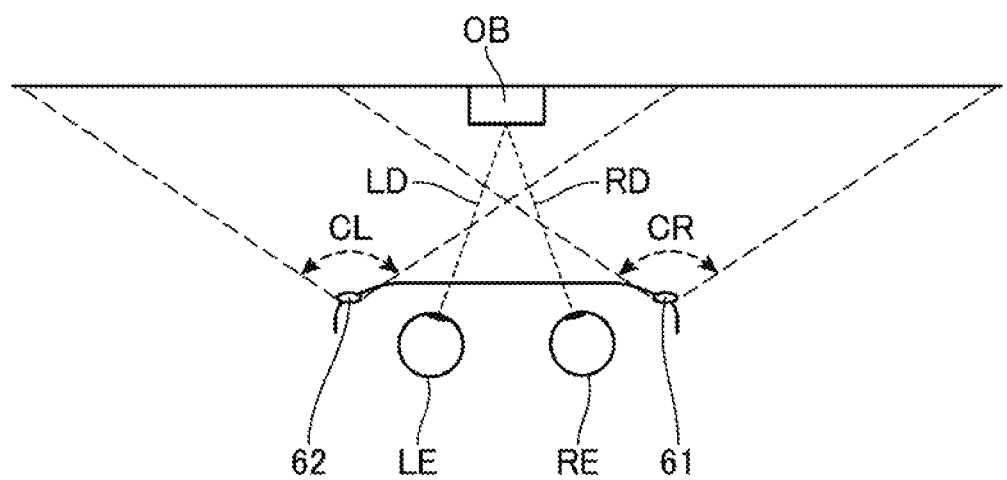

FIGS. 3A and 3B are diagrams showing the main part configuration of the image display section 20. FIG. 3A is a main part perspective view of the image display section 20 viewed from the head side of the user. FIG. 3B is an explanatory diagram of angles of view of the right camera 61 and the left camera 62. Note that, in FIG. 3A, the right cord 42, the left cord 44, and the like connected to the image display section 20 are not shown.

FIG. 3A is a side in contact with the head of the user of the image display section 20, in other words, a side seen by a right eye RE and a left eye LE of the user. In other words, the rear sides of the right optical-image display section 26 and the left optical-image display section 28 are seen.

In an example shown in FIG. 3A, the half mirror 261A for radiating image light on the right eye RE of the user and the half mirror 262A for radiating image light on the left eye LE of the user are seen as substantially square regions. The entire right and left optical-image display sections 26 and 28 including the half mirrors 261A and 262A transmit external light as explained above. Therefore, the user visually recognizes an outside scene through the entire right and left optical-image display sections 26 and 28 and visually recognizes rectangular display images in the positions of the half mirrors 261A and 262A.

As explained above, the right camera 61 is disposed at the end portion on the right holding section 21 side to face the front of the image display section 20. The left camera 62 is disposed at the end portion on the left holding section 23 side.

FIG. 3B is a diagram schematically showing, in plan view, the positions of the right camera 61 and the left camera 62 together with the right eye RE and the left eye LE. An angle of view (an image pickup range) of the right camera 61 is indicated by CR. An angle of view (an image pickup range) of the left camera 62 is indicated by CL. Note that, in FIG. 3B, the angles of view CR and CL in the horizontal direction are shown. However, actual angles of view of the right camera 61 and the left camera 62 expand in the up-down direction like an angle of view of a general digital camera.

The angle of view CR and the angle of view CL are substantially symmetrical with respect to the center position of the image display section 20. Both of the angle of view CR and the angle of view CL include the right front direction in the center position of the image display section 20. Therefore, the angles of view CR and CL overlap in the front in the center position of the image display section 20.

For example, as shown in FIG. 3B, when a target OB is present in the front direction of the image display section 20, the target OB is included in both of the angle of view CR and the angle of view CL. Therefore, the target OB appears in both of a picked-up image of the right camera 61 and a picked-up image of the left camera 62. When the user gazes at the target OB, the visual line of the user is directed to the target OB as indicated by signs RD and LD in the figure. In general, a viewing angle of a human is approximately 200 degrees in the horizontal direction and approximately 125 degrees in the vertical direction. In the viewing angle, an effective visual field excellent in information acceptability is approximately 30 degrees in the horizontal direction and approximately 20 degrees in the vertical direction. Further, a stable gazing field in which a gazing point of the human is quickly and stably seen is approximately 60 to 90 degrees in the horizontal direction and approximately 45 to 70 degrees in the vertical direction.

Therefore, when the gazing point is the target OB, the effective visual field is approximately 30 degrees in the horizontal direction and approximately 20 degrees in the vertical direction centering on the visual lines RD and LD. The stable gazing field is approximately 60 to 90 degrees in the horizontal direction and approximately 45 to 70 degrees in the vertical direction. The viewing angle is approximately 200 degrees in the horizontal direction and approximately 125 degrees in the vertical direction.

An actual visual field visually recognized by the user wearing the HMD 100 through the right optical-image display section 26 and the left optical-image display section 28 of the image display section 20 is referred to as an actual visual field (FOV). In the configuration of this embodiment shown in FIGS. 1 and 2, the actual visual field is equivalent to an actual visual field visually recognized by the user through the right optical-image display section 26 and the left optical-image display section 28. The actual visual field is narrower than the viewing angle and the stable gazing field explained with reference to FIG. 3B but is wider than the effective visual field.

The right camera 61 and the left camera 62 are desirably capable of picking up images in a range wider than the visual field of the user. Specifically, the entire angles of view CR and CL are desirably wider than at least the effective visual field of the user. The entire angles of view CR and CL are more desirably wider than the actual visual field of the user. The entire angles of view CR and CL are still more desirably wider than the stable gazing field of the user. The entire angles of view CR and CL are most desirably wider than the viewing angle of the user.

Therefore, in the right camera 61 and the left camera 62, the angle of view CR and the angle of view CL are arranged to overlap in the front of the image display section 20 as shown in FIG. 3B. The right camera 61 and the left camera 62 may be configured by wide-angle cameras. That is, the right camera 61 and the left camera 62 may include so-called wide-angle lenses as image pickup lenses and may be capable of picking up images in a wide angle of view. The wide-angle lens may include lenses called super-wide-angle lens and semi-wide-angle lens. The wide-angle lens may be a single focus lens or may be a zoom lens. The right camera 61 and the left camera 62 may include a lens group consisting of a plurality of lenses. The angle of view CR of the right camera 61 and the angle of view CL of the left camera 62 do not have to be the same angle. An image pickup direction of the right camera 61 and an image pickup direction of the left camera 62 do not need to be completely parallel. When a picked-up image of the right camera 61 and a picked-up image of the left camera 62 are superimposed, an image in a range wider than the visual field of the user only has to be picked up.

Figure 4:
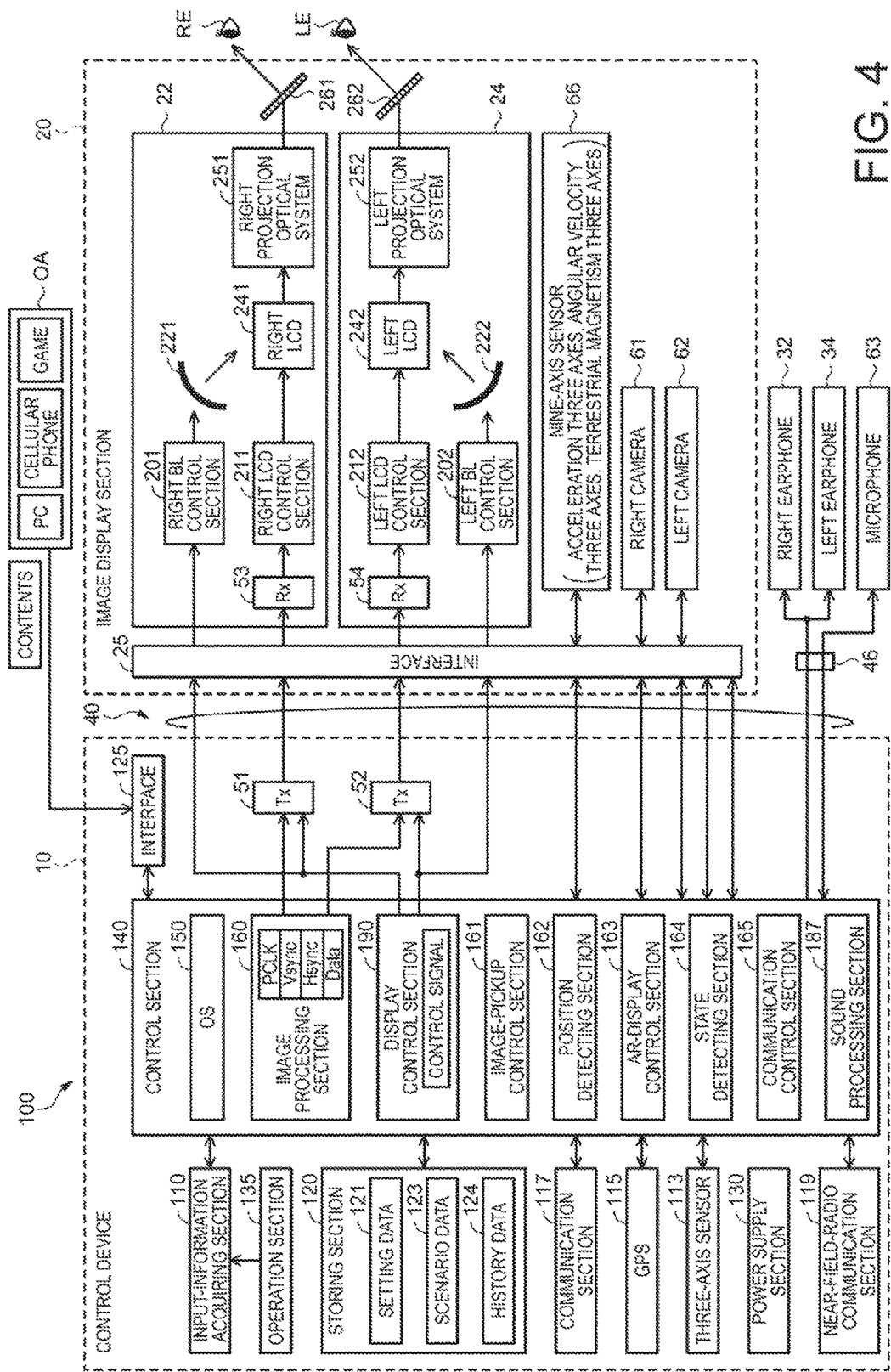
FIG. 4 is a functional block diagram of sections included in the HMD.

FIG. 4 is a functional block diagram of the sections included in the HMD 100.

The HMD 100 includes an interface 125 that connects various external apparatuses OA functioning as supply sources of contents. As the interface 125, interfaces adapted to wired connection such as a USB interface, a micro USB interface, or an interface for a memory card can be used. The interface 125 may be configured by a radio communication interface. The external apparatus OA is an image supply apparatus that supplies images to the HMD 100. As the external apparatus OS, for example, a personal computer (PC), a cellular phone terminal, or a portable game machine is used.

The control device 10 includes the control section 140, an input-information acquiring section 110, a storing section 120, and a transmitting section (Tx) 51 and a transmitting section (Tx) 52.

The input-information acquiring section 110 is connected to an operation section 135. The operation section 135 includes the track pad 14, the direction key 16, and the power switch 18. The input-information acquiring section 110 acquires input content on the basis of a signal input from the operation section 135. The control device 10 includes a power supply section (not shown in the figure) and supplies electric power to the sections of the control device 10 and the image display section 20.

The storing section 120 is a nonvolatile storage device and has stored therein various computer programs and data related to the computer programs. The storing section 120 may store data of still images and moving images to be displayed on the image display section 20.

The storing section 120 stores setting data 121. The setting data 121 includes various setting values used by the control section 140. The setting values included in the setting data 121 may be values input in advance by operation of the operation section 135. The storing section 120 may receive setting values from the external apparatus OA or other apparatuses (not shown in the figure) via the communication section 117 or the interface 125 and store the setting values.

The storing section 120 stores scenario data 123 and history data 124. The scenario data 123 is data used for informing the user wearing the HMD 100 of a work procedure and the like. The history data 124 is data including information concerning the progress of work, an execution history, and the like related to the scenario data 123. The scenario data 123 and the history data 124 are explained below. The scenario data 123 includes item data and order data. The storing section 120 is equivalent to the order-data storing section. Since the storing section 120 stores the history data 124 (execution data), the storing section 120 is equivalent to the execution-data storing section.

A three-axis sensor 113, a GPS 115, a communication section 117, a near-field-radio communication section 119, and a sound recognizing section 114 are connected to the control section 140. The three-axis sensor 113 is a three-axis acceleration sensor. The control section 140 acquires detection values of the three-axis sensor 113. With the three-axis sensor 113, the control section 140 can detect a movement of the control device 10 and can detect operation such as shaking of the control device 10. The three-axis sensor 113 may be replaced with a nine-axis sensor including a three-axis acceleration sensor, a three-axis angular velocity sensor, and a three-axis terrestrial magnetism sensor. In this case, the control section 140 can acquire respective detection values of the three-axis acceleration sensor, the three-axis angular velocity sensor, and the three-axis terrestrial magnetism sensor and detect, for example, a posture, a direction, and a movement of the control device 10.

The GPS 115 includes an antenna (not shown in the figure), receives a GPS (Global Positioning System) signal, and calculates the present position of the control device 10. The GPS 115 outputs the present position and the present time calculated on the basis of the GPS signal to the control section 140. The GPS 115 may include a function of acquiring the present time on the basis of information included in the GPS signal and causing the control section 140 to correct time clocked by the control section 140.

The communication section 117 executes wireless data communication conforming to a standard of wireless communication such as a wireless LAN (WiFi (registered trademark)), a Miracast (registered trademark), or a Bluetooth (registered trademark).

When the external apparatus OA is connected to the communication section 117 by radio, the control section 140 acquires content data from the communication section 117 and causes the image display section 20 to display an image. On the other hand, when the external apparatus OA is connected to the interface 125 by wire, the control section 140 acquires content data from the interface 125 and causes the image display section 20 to display an image. The communication section 117 and the interface 125 function as a data acquiring section DA that acquires content data from the external apparatus OA.

The near-field-radio communication section 119 is a communication section that executes near field radio data communication according to the control by the control section 140. The near-field-radio communication section 119 includes a radio communication interface including an antenna, an RF circuit, and a baseband circuit not shown in the figure. The near-field-radio communication section 119 executes, for example, radio communication called NFC (Near Field radio Communication). Specifically, the near-field-radio communication section 119 performs near field radio communication such as Felica (registered trademark), ISO/IEC 14443, and ISO/IEC 18092. The near-field-radio communication section 119 may execute radio communication conforming to the Bluetooth standard. In this case, for example, the near-field-radio communication section 119 desirably includes an antenna and an RF circuit (not shown in the figure) corresponding to a Bluetooth class 3 (with an output of 1 mw) and is suitable for radio communication in a short distance. The near-field-radio communication section 119 may be configured as a so-called IC tag reader, execute radio communication with an external IC tag (not shown in the figure), and acquire data from the IC tag.

The control section 140 includes a CPU (not shown in the figure) that executes a computer program, a RAM (not shown in the figure) that temporarily stores the computer program executed by the CPU and data, and a ROM (not shown in the figure) that stores, in a nonvolatile manner, a basic control program executed by the CPU and data. The control section 140 reads out and executes a computer program stored by the storing section 120 and functions as an operating system (OS) 150, an image processing section 160, the image-pickup control section 161, a position detecting section 162, an AR-display control section 163, a state detecting section 164, a communication control section 165, a sound processing section 187, and a display control section 190.

The image processing section 160 acquires an image signal included in contents. The image processing section 160 separates, from the acquired image signal, synchronization signals such as a vertical synchronization signal VSync and a horizontal synchronization signal HSync. The image processing section 160 generates, according to cycles of the vertical synchronization signal VSync and the horizontal synchronization signal HSync separated from the image signal, a clock signal PCLK using a PLL (Phase Locked Loop) circuit or the like (not shown in the figure). The image processing section 160 converts an analog image signal, from which the synchronization signals are separated, into a digital image signal using an A/D conversion circuit or the like (not shown in the figure). The image processing section 160 stores the digital image signal after the conversion in the RAM of the control section 140 frame by frame as image data (in the figure, Data) of a target image. The image data is, for example, RGB data.

Note that the image processing section 160 may perform, according to necessity, resolution conversion processing for converting the resolution of the image data into resolution suitable for the right display driving section 22 and the left display driving section 24. The image processing section 160 may execute, for example, image adjustment processing for adjusting the luminance and the chroma of the image data and 2D/3D conversion processing for generating 2D image data from 3D image data or generating 3D image data from 2D image data.

The image processing section 160 transmits the clock signal PCLK, the vertical synchronization signal Vsync, the horizontal synchronization signal HSync, and the image data Data stored in the RAM via the transmitting sections 51 and 52. The transmitting sections 51 and 52 function as a transceiver and execute serial transmission between the control device 10 and the image display section 20. Note that the image data Data transmitted via the transmitting section 51 is referred to as "image data for right eye" and the image data Data transmitted via the transmitting section 52 is referred to as "image data for left eye".

The display control section 190 generates a control signal for controlling the right display driving section 22 and the left display driving section 24 and controls, with the control signal, generation and emission of image light by each of the right display driving section 22 and the left display driving section 24. Specifically, the display control section 190 controls driving ON/OFF of the right LCD 241 by a right LCD control section 211 and driving ON/OFF of the right backlight 221 by a right backlight control section 201. The display control section 190 controls driving ON/OFF of the left LCD 242 by a left LCD control section 212 and driving ON/OF of the left backlight 222 by a left backlight control section 202.

The sound processing section 187 acquires a sound signal included in contents, amplifies the acquired sound signal, and outputs the amplified sound signal to the right earphone 32 and the left earphone 34. The sound processing section 187 acquires sound collected by the microphone 63 and converts the sound into digital sound data. The sound processing section 187 may perform processing set in advance on the digital sound data.

The image display section 20 includes the right camera 61 and the left camera 62. The image display section 20 includes an interface 25, the right display driving section 22, the left display driving section 24, the right light guide plate 261 functioning as the right optical-image display section 26, the left light guide plate 262 functioning as the left optical-image display section 28, and a nine-axis sensor 66.

The nine-axis sensor 66 is a motion sensor that detects acceleration (three axes), angular velocity (three axes), and terrestrial magnetism (three axes). When the image display section 20 is worn on the head of the user, the control section 140 can detect a movement of the head of the user on the basis of detection values of the nine-axis sensor 66. For example, the control section 140 can estimate the magnitude and the direction of a tilt of the image display section 20 on the basis of the detection values of the nine-axis sensor 66.

The interface 25 includes a connector to which the right cord 42 and the left cord 44 are connected. The interface 25 outputs the clock signal PCLK, the vertical synchronization signal VSync, the horizontal synchronization signal HSync, and the image data Data transmitted from the transmitting section 51 to a receiving section (Rx) 53 or 54 corresponding to the transmitting section 51. The interface 25 outputs the control signal transmitted from the display control section 190 to the receiving section 53 or 54 and the right backlight control section 201 or the left backlight control section 202 corresponding to the display control section 190.

The interface 25 is an interface that connects the right camera 61, the left camera 62, and the nine-axis sensor 66. Picked-up image data of the right camera 61 and the left camera 62 and detection results of acceleration (three axes), angular velocity (three axes), and terrestrial magnetism (three axes) by the nine-axis sensor 66 are sent to the control section 140 via the interface 25.

The right display driving section 22 includes the right backlight 221, the right LCD 241, and the right projection optical system 251. The right display driving section 22 includes the receiving section 53, the right backlight (BL) control section 201 that controls the right backlight (BL) 221, and the right LCD control section 211 drives the right LCD 241.

The receiving section 53 operates as a receiver corresponding to the transmitting section 51 and executes serial transmission between the control device 10 and the image display section 20. The right backlight control section 201 drives the right backlight 221 on the basis of an input control signal. The right LCD control section 211 drives the right LCD 241 on the basis of the clock signal PCLK, the vertical synchronization signal VSync, the horizontal synchronization signal HSync, and the image data for right eye Data input via the receiving section 53.

The left display driving section 24 has a configuration same as the configuration of the right display driving section 22. The left display driving section 24 includes the left backlight 222, the left LCD 242, and the left projection optical system 252. The left display driving section 24 includes the receiving section 54, the left backlight control section 202 that drives the left backlight 222, and the left LCD control section 212 that drives the left LCD 242.

The receiving section 54 operates as a receiver corresponding to the transmitting section 52 and executes serial transmission between the control device 10 and the image display section 20. The left backlight control section 202 drives the left backlight 222 on the basis of an input control signal. The left LCD control section 212 drives the left LCD 242 on the basis of the clock signal PCLK, the vertical synchronization signal VSync, the horizontal synchronization signal HSync, and the image data for right eye Data input via the receiving section 54.

Note that the right backlight control section 201, the right LCD control section 211, the right backlight 221, and the right LCD 241 are collectively referred to as "image-light generating section" on the right as well. Similarly, the left backlight control section 202, the left LCD control section 212, the left backlight 222, and the left LCD 242 are collectively referred to as "image-light generating section" on the left as well.

As shown in FIG. 3A, a range in which the user wearing the HMD 100 visually recognizes image lights radiated from the half mirrors 261A and 262A is smaller than the actual visual field. For example, when the HMD 100 displays an image that achieves an AR (Augmented Reality) effect (hereinafter referred to as AR image), the HMD 100 displays the AR image to overlap the target OB gazed by the user. In this case, the AR effect is obtained because the AR image is seen overlapping the target OB. However, a region where the AR image is visually recognized is limited by the size of the half mirrors 261A and 262A. Therefore, even when the target OB is included in the actual visual field, it is sometimes difficult to display the AR image in a position overlapping the target OB. When an image other than the AR image is displayed, a region where the HMD 100 can display the image is smaller than the actual visual field. This is likely to limit functions.

The HMD 100 performs display corresponding to the outside scene, for example, displays AR contents corresponding to the target OB in the outside scene gazed by the user using images of the outside scene in a range wider than the actual visual field of the user such as picked-up images of the right camera 61 and the left camera 62 and images prepared in advance.

In the HMD 100, the half mirror 261A and the half mirror 262A reflect image lights on the eyes of the user to thereby form a display region. The HMD 100 reflects the image lights with the half mirrors 261A and 261B and causes the eyes of the user to visually recognize virtual images. Therefore, in this embodiment, the display region is not the half mirrors 261A and 262A themselves and is a region where the user senses the image lights reflected on the half mirrors 261A and 262A. Not that, when the image display section 20 causes the half mirrors 261A and 262A to form images, the half mirrors 261A and 262A are equivalent to the display region.

The display region is a region corresponding to the right LCD 241 and the left LCD 242. In the display region, the user visually recognizes images displayed on the LCDs 241 and 242. For example, when images are displayed over entire regions where the right LCD 241 and the left LCD 242 can display images (a displayable region), it is possible to cause the user to visually recognize an image having the size of the entire display region.

For example, as explained below, the display region is located substantially in the center of the visual field of the user and is as large as the visual field or smaller than the visual field.

The image-pickup control section 161 controls the right camera 61 and the left camera 62 to execute image pickup and acquires picked-up image data. The image-pickup control section 161 may cause one of the right camera 61 and the left camera 62 to execute the image pickup or may cause both of the right camera 61 and the left camera 62 to execute the image pickup.

The position detecting section 162 (the input section and the target detecting section) executes a function of the control section 140 detecting (recognizing) a target (a target object) from an outside scene image. In the function, the position detecting section 162 analyzes, for example, picked-up image data acquired by the image-pickup control section 161. Specifically, the position detecting section 162 detects the position of a target of AR display and an operation position of operation by the user on the basis of the picked-up image data of the right camera 61 and/or the left camera 62. In the position detecting section 162, as a target to be detected, a target on which the AR display is performed and a pointer used for operation by the user are set.

The target of the AR display forms a part of a range visually recognized by the user through the image display section 20 (the visual field of the user) such as an object in a real space (including a fixed object such as a building) or a scene. The target of the AR display is detected from the picked-up image data of the right camera 61 and the left camera 62. The control section 140 displays AR contents according to the detected target.

The target can be set for each of contents of the AR display. For example, data used in processing for detecting a target may be included in data of the contents of the AR display (hereinafter referred to as AR contents). Data concerning a target to be detected may be stored as the setting data 121. The position detecting section 162 acquires data for detecting a target from the AR contents or the setting data 121 and recognizes a target included in an outside scene image using the data. The data for detecting a target is data used for processing for detecting an image of a target, which is an object present in the real space, from a picked-up image and is, for example, a feature value of the image of the target. For example, when the target is an object, a feature value indicating a color, a shape, or another feature of a picked-up image of the object is included in the setting data. In this case, the position detecting section 162 performs processing for extracting an image of the object from image data of the outside scene image, calculates a feature value of the extracted image of the object, and compares and collates the calculated the feature value and the feature value included in the setting data 121. When the feature values are values close to each other or the same value, the object of the image extracted from the outside scene image can be recognized as a target. When a plurality of feature values are included in the setting data 121 concerning the target, the position detecting section 162 can detect the target from the outside image on the basis of the plurality of feature values and recognize the target. When the position detecting section 162 cannot recognize the target in the outside scene image, the position detecting section 162 stays on standby until the image-pickup control section 161 acquires a new outside scene image in step S12. The detecting section 162 performs processing for recognizing a target concerning the new outside scene image.

The control section 140 has a function of recognizing and detecting an input by the user. The function can be realized as a function of the input section. The input section detects an image of a pointer such as a hand of the user from picked-up images of the right camera 61 and/or the left camera 62 and detects and recognizes a position, a direction, or a movement of the pointer as an input. For example, the input section specifies the position of the pointer and detects a position input. For example, when determining that the movement of the pointer is equivalent to a gesture set in advance, the input section may detect and recognize a gesture input. The input section detects operation on the operation section 135 on the basis of a signal input from the input-information acquiring section 110. When the sound processing section 187 analyzes voice collected by the microphone 63 and determines that the voice is a voice command set in advance, the input section may detect and recognize an input of the voice command. When determining that a pattern of a detection value of the nine-axis sensor 66 included in the image display section 20 corresponds to operation for knocking the image display section 20, the position detecting section 162 may detect and recognize the knock operation on the image display section 20 as an input. When detecting an image of a marker for input such as a two-dimensional code or a barcode from the picked-up images of the right camera 61 and/or the left camera 62, the position detecting section 162 may detect and recognize a marker reading input. When detecting an indicator or a marker from the picked-up image data of the right camera 61 and/or the left camera 62, the position detecting section 162 may detect and recognize a pointer or a marker corresponding to a visual line direction of the user detected by a visual line sensor 68.

The HMD 100 may include a footswitch (not shown in the figure) operated by the user with a foot. The footswitch may be connected to the control section 140 or the operation section 135 by wire or may be connected to the communication section 117 by radio communication such as the Bluetooth (registered trademark). In this case, the input section may detect operation of the footswitch and recognize the operation as an input. Vital sensors such as an electromyograph (not shown in the figure), a pulse measuring device (not shown in the figure), a blood-pressure measuring device (not shown in the figure), and a blood-oxygen-concentration measuring device (not shown in the figure) may be provided in the HMD 100. The input section may detect and recognize an input on the basis of measurement values and detection values of the vital sensors.

In this embodiment, the position detecting section 162 operates as the input section. The position detecting section 162 detects an image of the pointer from the picked-up image data of the right camera 61 and the left camera 62 and detects a position pointed by the pointer. The pointer is an object used by the user for operation and is a part of the body such as a hand or a finger of the user or an object manipulated by the user. The shape of the object is not particularly limited and may be any shape such as a bar shape or a pen shape. A light emitting section (not shown in the figure) that emits infrared light or visible light may be provided in the pointer. Marking including a design or a pattern detectable in the picked-up image data may be applied to the pointer. In this case, the position detecting section 162 can quickly perform processing for detecting the pointer from the picked-up image data. Like the processing for detecting the target from the picked-up image data, the position detecting section 162 detects the pointer from the picked-up image data using the data of the feature values stored in the storing section 120 in advance. The data of the feature values of the pointer is included in, for example, the setting data 121.

The position detecting section 162 specifies the position of the target and the position of the pointer detected from the picked-up image data. Further, the position detecting section 162 performs processing for calculating relative positions of the detected target and the pointer and the display region visually recognized by the user. Consequently, it is possible to perform association of the positions of images (including characters, images, and signs) displayed by the right display driving section 22 and the left display driving section 24 and the positions of the target and the pointer in the real space.

That is, it is possible to associate positions where the user visually recognizes the images displayed by the right display driving section 22 and the left display driving section 24 and positions where the user visually recognizes the target and the pointer through the image display section 20. Therefore, it is possible to accurately detect a position pointed by the user with the pointer. It is possible to display an image in a position corresponding to the position where the user visually recognizes the target.

Note that a method of the position detecting section 162 recognizing the pointer and an object (including a target) in the real space other than the pointer is not limited to the method of recognizing an image of the target on the basis of feature values of the image as explained above. For example, the target and the pointer may be selected from an object or the like included in an outside scene image according to an instruction of the user. In this case, an instruction of the user may be an instruction by voice. The sound processing section 187 converts voice collected by the microphone 63 into a text, whereby the position detecting section 162 acquires information for recognizing and specifying the target. For example, when voice for designating features of the target in a picked-up image such as a color and a shape of the target is converted into a text, the position detecting section 162 detects an image corresponding to the designated feature from the picked-up image and recognizes the picked-up image.

A method of inputting information concerning the target may be operation on the track pad 14. The control section 140 may detect gesture operation by a finger or the like. In this case, the user only has to move a finger or the like and perform gesture operation in an image pickup range of the right camera 61 and the left camera 62. The control section 140 only has to detect the gesture operation. Specifically, a method may be adopted in which the user points the target to designate the target itself. The user may use a gesture for, for example, pointing the direction of the target with a hand or a finger or surrounding, with a hand or a finger, a range in which the user visually recognizes the target.

The AR-display control section 163 reads out content data (not shown in the figure) stored by the storing section 120, controls the image processing section 160 and the display control section 190, and causes the image display section 20 to display an image for the AR display. When the content data includes sound data, the AR-display control section 163 controls the sound processing section 187 to output sound of contents from the right earphone 32 and the left earphone 34.

The AR-display control section 163 controls a display position of the AR contents on the basis of relative positions of the target detected by the position detecting section 162 and the display region and relative positions of the pointer and the display region. That is, the AR-display control section 163 performs the AR display for displaying an image, characters, or the like in a position corresponding to the target. The display position of the AR contents may be either a position overlapping the position or a position around the target. Consequently, the HMD 100 provides information concerning the target or changes appearance of a figure of the target seen through the image display section 20. The AR contents include data of the image or the characters displayed in the position corresponding to the target. The AR-display control section 163 determines the display position of the AR contents corresponding to the detected target and displays the AR contents.

The AR-display control section 163 may control an angle of convergence of the AR display according to a distance in which the user visually recognizes the target detected by the position detecting section 162. The angle of convergence is an angle formed by the visual lines RD and LD shown in FIG. 3B. As the distance from the image display section 20 (or the eyes RE and LE of the user) to the target OB is longer, the angle is smaller. When the user visually recognizes the AR image displayed by the image display section 20, the angle of the visual lines RD and LD is determined according to the display position of the AR image in the display region of the image display section 20. A distance in which the user senses the AR image changes according to the angle. For example, when display positions of the AR image on the left and right are set to increase the angle formed by the visual lines RD and LD, for the user, the AR image is seen as if the AR image is present in a position close to the user. The AR-image control section 163 may adjust the display position of the AR image in the display region of the image display section 20 according to the distance to the AR image that the AR-display control section 163 desires the user to sense. Processing related to the adjustment can be referred to as angle of convergence control.

As explained in detail below, when the user performs work (a motion) on a target detected by the position detecting section 162, the AR-image display section 163 performs the AR display of a work item such that the work item can be visually recognized together with the target. In this case, the AR-image display section 163 adjusts the display position of the AR image in the display region of the image display section 20 such that the distance in which the user senses the AR image matches the distance to the target detected by the position detecting section 162. Consequently, the user can naturally view the target and the AR image as if the user views objects present as the same distance. It is possible to reduce a burden on the user.

In this embodiment, the AR-display control section 163 displays data of items included in the scenario data 123 on the basis of the scenario data 123 stored by the storing section 120. That is, an image in which the scenario data 123 is displayed in a predetermined display form explained below is equivalent to the AR contents.

Figure 5A:
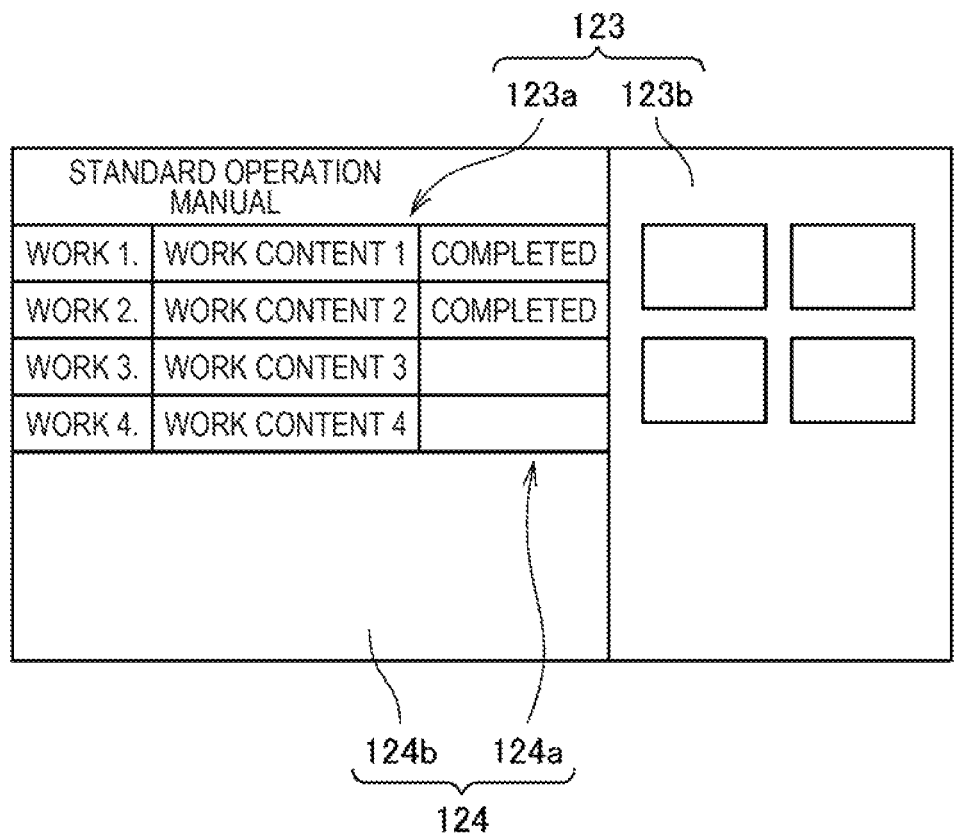
FIG. 5A is a schematic diagram showing a configuration example of data stored by a storing section and shows a configuration example of scenario data and history data.
Figure 5B:
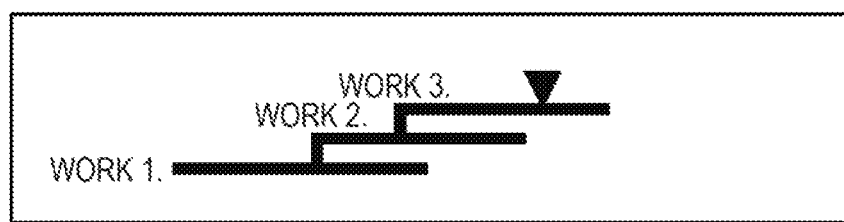
FIG. 5B is a schematic diagram showing a configuration example of the data stored by the storing section and shows another configuration example of the scenario data and the history data.

FIGS. 5A and 5B are schematic diagrams showing configuration examples of data stored by the storing section 120. FIG. 5A shows a configuration example of the scenario data 123 and the history data 124. FIG. 5B shows another configuration example of the history data 124.

The scenario data 123 includes items. Order is associated with the items. The order is relative order among the items. When the scenario data 123 includes one item, order does not have to be associated with the item.

The respective items included in the scenario data 123 correspond to motions. The motions indicate behaviors or acts performed by the user. The motions may be movements of the body of the user or may include thoughts and determinations. One item of the scenario data 123 may correspond to one motion. One item of the scenario data 123 may correspond to a sequence including a plurality of motions.

The scenario data 123 illustrated in FIG. 5A is data of a scenario concerning a procedure of work and includes a plurality of items 123a respectively corresponding to works. The respective items 123a are named "work 1", "work 2", "work 3", and the like. Contents (work contents) of the items are associated with the respective items 123a and included in the scenario data 123.

The scenario data 123 shown in FIG. 5A is a form in which the history data 124 is integrated. The history data 124 is data concerning a history of execution of the items included in the scenario data 123. When the scenario data 123 is a scenario of the works, the history data 124 is data concerning a progress history and an execution history of the works corresponding to the items of the scenario data 123. In the example shown in FIG. 5A, the history data 124 includes execution history data 124a and execution detail data 124b. The execution history data 124a is data stored in association with the respective items 123a and indicates execution states (which can also be considered execution situations, progress situations, or progress statuses) of the works corresponding to the items 123a. In the example shown in FIG. 5A, when the works corresponding to the items 123a have been completed, "completed" is set as the execution history data 124a. Besides, the execution history data 124a such as executed and unexecuted can be set.

The execution detail data 124b includes more detailed data concerning a history of execution of the works corresponding to the items 123a. For example, the execution detail data 124b includes data such as date and time of execution of the works of the respective items 123a included in the scenario data 123, a progress degree of the works, and date and time of completion of the works. The execution detail data 124b may include picked-up image data picked up by the right camera 61 and/or the left camera 62 when the works corresponding to the items 123a are executed. The picked-up image data may be still image data or moving image data or may include data of image pickup date and time.

The scenario data 123 may include image data 123b in association with the items 123a. The image data 123b may be still image data or may be moving image data.

In FIG. 5B, another configuration example of the scenario data 123 and the history data 124 is shown. FIG. 5B shows, in particular, an example in which execution order of the items 123a and a history of works corresponding to the items 123a are displayed as a time chart. For example, the time chart shown in FIG. 5B is displayed on the display section 20 according to control by the AR-display control section 163. The time chart includes execution order of works 1, 2, and 3 corresponding to the items 123a and an indicator (a mark) of an arrow shape indicating the present work situation. For example, when the AR-display control section 163 informs work based on the scenario data 123 and the user executes the work, the AR-display control section 163 can display the time chart shown in FIG. 5B and inform the user of an execution state of work.

When the HMD 100 informs the user of work or the like on the basis of the scenario data 123, an execution state and the like of the work can be input according to input operation by the user.

An input method in the HMD 100 is explained.

Figure 6A:
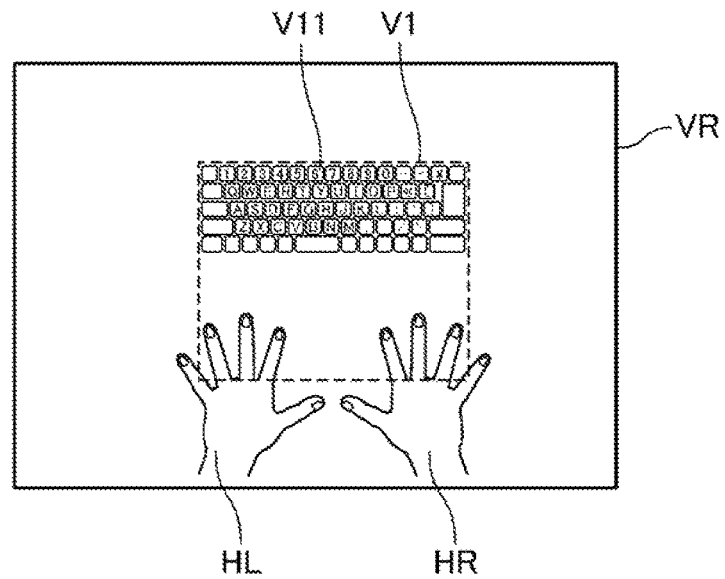
FIG. 6A is an explanatory diagram of an input method in the HMD and shows an input example in which a virtual keyboard is used.
Figure 6B:
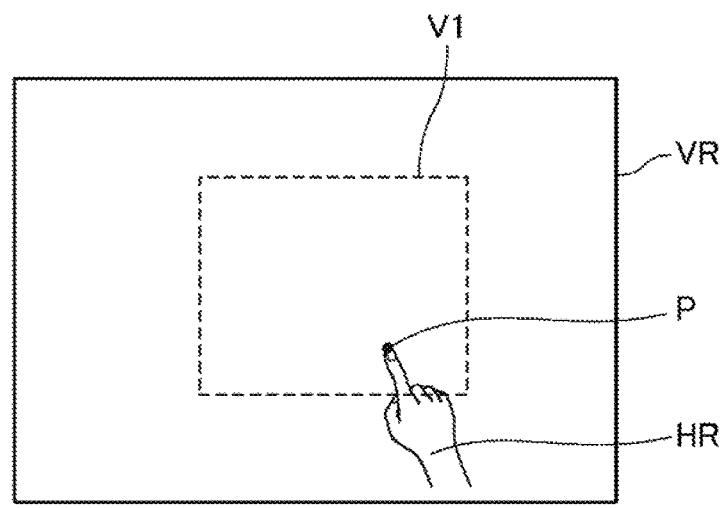
FIG. 6B is an explanatory diagram of an input method in the HMD and shows an example of a position input.

FIGS. 6A and 6B are explanatory diagrams of the input method in the HMD 100. FIG. 6A shows an input example in which a virtual keyboard is used. FIG. 6B shows an example of a position input.

In FIGS. 6A and 6B, VR indicates a visual field of the user and V1 indicates a region where the HMD 100 can display an image and cause the user to visually recognize the image, that is, the display region of the image display section 20.

For example, the display region V1 is located substantially in the center of the visual field VR of the user and is narrow than the visual field VR. The display region V1 may have size same as the size of the visual field VR. The size and the position of the display region V1 are not limited to the examples shown in FIGS. 6A and 6B.

In the input method shown in FIG. 6A, the user performs an input using a hand of the user in a state in which a virtual keyboard V11 is displayed in the display region V1. A display position of the virtual keyboard V11 can be a position set in advance. The AR-display control section 163 displays the virtual keyboard V11 on the basis of image data (not shown in the figure) or the like of the virtual keyboard V11 stored in the storing section 120. The position detecting section 162 detects a right hand HR and a left hand HL of the user in the visual field VR and calculates positions of fingertips. Regions where the position detecting section 162 is capable of detecting a position are image pickup ranges of the right camera 61 and the left camera 62. The regions may be outside the display region V1. When the positions of the fingertips calculated by the position detecting section 162 and display positions of keys of the virtual keyboard V11 overlap, the AR-display control section 163 detects operation on the keys of the virtual keyboard V11.

FIG. 6B shows an input method for performing position pointing operation (position input operation) with a hand of the user in a state in which the virtual keyboard V11 is not displayed in the display region V1. The input method has an advantage that the input method can be executed even if nothing is displayed in the display region V1 and, for example, does not affect the visibility of an outside scene seen through the image display section 20. The position detecting section 162 detects fingertips of the hand (in the figure, the right hand HR) of the user from picked-up image data and calculates a position of a fingertip P. The AR-display control section 163 acquires, as an input position, the position of the fingertip P calculated by the position detecting section 162. The position detecting section 162 may be configured to, for example, output a coordinate indicating a relative position of the fingertip P with respect to the display region V1. The position detecting section 162 may be configured to output a coordinate of a relative position of the fingertip P with respect to the visual field VR.

Figure 7A:
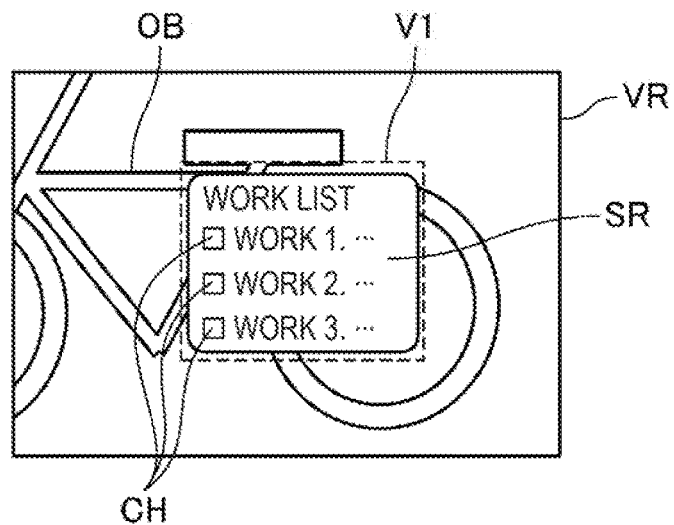
FIG. 7A is a diagram showing a display example in the HMD.
Figure 7B:
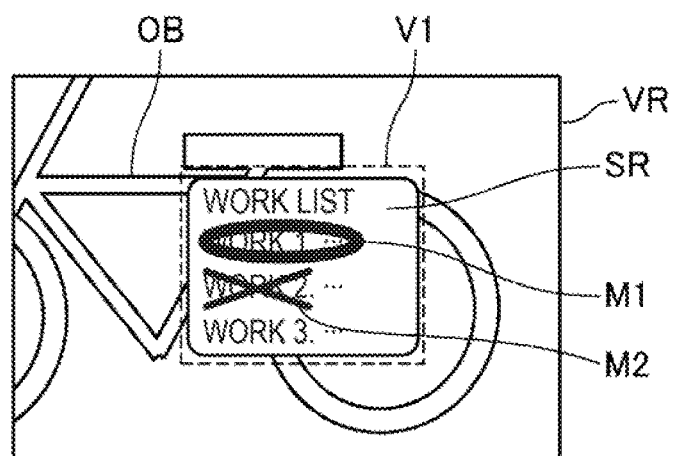
FIG. 7B is a diagram showing a display example in the HMD.
Figure 7C:
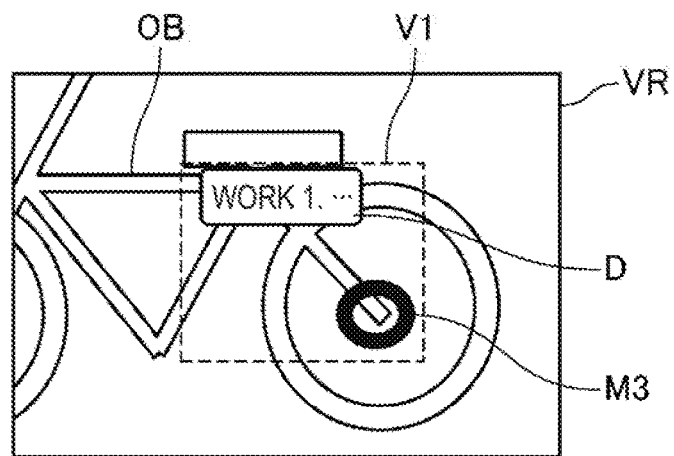
FIG. 7C is a diagram showing a display example in the HMD.

FIGS. 7A, 7B, and 7C are diagrams showing display examples in the HMD 100 and show examples of display forms in which the items of the scenario data 123 are displayed according to the control by the AR-display control section 163.

In the examples shown in FIGS. 7A, 7B, and 7C, the target OB is included in the visual field VR of the user. The user visually recognizes the target OB through the image display section 20. The position detecting section 162 detects the position of the target OB, which is a target on which the AR display is performed, from a picked-up image of the camera 61.

In the example shown in FIG. 7A, the AR-display control section 163 displays a list SR in which the items of the scenario data 123 are displayed as a list. The list SR is a list in which the names of the items included in the scenario data 123 are arranged according to the order of the items set in the scenario data 123. In the list SR, contents of the items may be displayed together with the names (titles) of the items.

In the list SR, checkboxes CH are arranged in association with display positions of the items. The checkboxes CH indicate that motions corresponding to the items have been completed. When the state detecting section 164 detects completion of a motion, the AR-display control section 163 changes a display state of the checkbox CH to a state indicating the motion completion. In this case, according to the control by the AR-display control section 163, concerning an item for which the motion has been completed and the checkbox CH has been checked, a display color may be changed or a display size may be reduced to indicate that the motion has been completed. The AR-display control section 163 may change the display color to enable the user to distinguish, from the other items, an item of a motion to be executed following the motion of the checked item and visually recognize the item. When the checkbox CH is checked concerning the item, the AR-display control section 163 may set, in the scenario data 123, a time stamp indicating date and time when the motion is completed.

When the scenario data 123 includes one item, the list SR includes a name and the checkbox CH concerning the one item.

The list SR may not include the checkboxes CH. In this case, the AR-display control section 163 may delete, from the list SR, an item for which completion of a motion is detected by the state detecting section 164. The AR-display control section 163 may change a display color or display luminance in the list SR. For example, concerning the item for which the motion has been completed, the AR-display control section 163 may change the display color or may reduce the display size to indicate that the motion has been completed. The AR-display control section 163 may change the display color to enable the user to distinguish, from the other items, an item of a motion to be executed following the completed motion and visually recognize the item.

As shown in FIG. 7B, in the list SR, a marker M1 may be displayed to overlap an item for which a motion has been completed. Further, concerning an item for which a motion is not completed or an item for which a motion is not performed and the next motion is started, a marker M2 indicating motion incompletion may be displayed.

An example of FIG. 7C is an example in which one of the items of the scenario data 123 is displayed or the items are displayed by a number set in advance at a time. In this example, in the display region V1, one name or one name and one content of an item of the scenario data 123 are displayed in a display section D of a balloon form. An end portion of the display section D may be formed in an arrow shape to indicate a position set as a target of a motion in the target OB. A marker M3 may be displayed in a target position of a motion corresponding to the item displayed in the display section D. In the example shown in FIG. 7C, when the state detecting section 164 detects that a motion corresponding to the item displayed in the display section D has been completed, the AR-display control section 163 displays an item of the next order included in the scenario data 123 on in display section D. In this way, in the display section D, the items included in the scenario data 123 are sequentially displayed according to execution order of the motions of the items.

Display positions and display forms of the list SR and the display section D can be changed as appropriate. For example, the list SR and the display section D may be displayed in a position overlapping the target OB of a motion corresponding to an item of the scenario data 123. If the list SR and the display section D are displayed in a position not overlapping the target OB, there is an advantage that the list SR and the display section D do not hinder the motion and the user can easily move while looking at the item. The list SR and the display section D may be displayed three-dimensionally (stereoscopically) or may be displayed as a two-dimensional (plane) image. Further, the list SR and the display section D may be displayed in only one of the right display driving section 22 and the left display driving section 24. The AR-display control section 163 may display the list SR and the display section D according to display order or importance and may more clearly display a motion set in the scenario data 123 as a motion that is particularly easily mistaken. Specifically, concerning the display of the list SR and the display section D, the AR-display control section 163 may perform highlighted display, enlarged display, a change in a display color, or the like according to display order or importance of a motion. The AR-display control section 163 may perform the highlighted display, the enlarged display, the change in the display color, or the like concerning a motion that is particularly easily mistaken. The AR-display control section 163 may shift, not to spoil the visibility of a target of a motion visually recognized through the image display section 20, display positions of the list SR and the display section D from the center of the target. Further, concerning an item set in the scenario data 123 as particularly fine work, the AR-display control section 163 may enlarge and display an item and an image in the list SR and the display section D. Further, concerning an item set in the scenario data 123 as complicated work, the AR-display control section 163 may display a moving image in the list SR and the display section D according to, for example, an input of the user.

When the list SR and the display section D are displayed, the time chart illustrated in FIG. 5B may be displayed. In this case, concerning the plurality of items, display with which the user can easily grasp execution order of motions can be performed. When position pointing operation for designating a position of the time chart is performed, an item corresponding to the position pointed in the time chart may be displayed. Concerning the item corresponding to the pointed position, image data included in the scenario data 123 may be displayed.

When an item is displayed in the list SR and the display section D, an image based on the image data 123b included in the scenario data 123 illustrated in FIG. 5A may be displayed together with the item. The list SR and the display section D and the image may be switched and displayed.

With the display of the list SR and the display section D, it is possible to meet needs of the user to, for example, check up to which motion in a series of motions including a plurality of motions (works) the user has completed work and create a record for securing traceability of work.

The state detecting section 164 (FIG. 4) detects an execution state of a motion (work) corresponding to the item 123a of the scenario data 123 while the AR-display control section 163 performs the display based on the scenario data 123.

The state detecting section 164 performs processing for detecting an execution state by, for example, analyzing picked-up image data of the right camera 61 and/or the left camera 62. In this case, the state detecting section 164 detects, from the picked-up image data, at least any one of a target of work, an instrument or a tool used in the work, the body of the user, and the like. The state detecting section 164 generates data concerning an execution state of the work on the basis of positions, sizes, colors, shapes, and the like of the target of the work, the instrument or the tool used in the work, the body of the user, and the like. The data concerning the execution state are, for example, unexecuted, under execution, execution completed, and the like.

In a state in which the AR-display control section 163 displays an item of the scenario data 123, the state detecting section 164 may detect an execution state of a motion corresponding to the item on the basis of operation by the user. In this case, operation detected by the state detecting section 164 may be operation on the operation section such as the track pad 14 of the control device 10. The state detecting section 164 may receive an input by the input method explained with reference to FIGS. 6A and 6B.

For example, in an example shown in FIG. 7A, when the user performs operation for designating the position overlapping the checkbox CH with the pointer as shown in FIG. 7B, the state detecting section 164 may detect that the motion has been completed. When the user performs a gesture set in advance with the pointer, the state detecting section 164 may detect that the motion has been completed. By analyzing voice collected by the microphone 63 with the sound processing section 187, the user may performs an instruction input with voice to indicate that the motion has been completed. The state detecting section 164 may detect on the basis of the instruction input that the motion has been completed. The state detecting section 164 may detect the completion of the motion on the basis of operation on the direction key 16, the track pad 14, or the like included in the control device 10.

After the AR-display control section 163 starts the display based on the scenario data 123, the state detecting section 164 may acquire picked-up image data of the right camera 61 and the left camera 62 and store the acquired picked-up image data as data concerning an execution state of a motion. In this case, for example, like a drive recorder, the state detecting section 164 may cause the storing section 120 to store picked-up image data during the motion.

The state detecting section 164 may generate a time chart (e.g., FIG. 5B) that reflects the detected execution state of the motion. The time chart may be a comparison time chart to which a comparison result representing a difference from a standard time set in advance is given.

The communication control section 165 controls the communication section 117 and the near-field-radio communication section 119 to execute radio communication with an external apparatus, an IC tag, or the like not shown in the figure and acquires data.

FIGS. 8A and 8B are schematic diagrams showing another configuration example of the scenario data 123 stored by the storing section 120. FIG. 8A shows a configuration example of scenario data 123e. FIG. 8B shows a configuration example of display setting data 126.

The scenario data 123e shown in FIG. 8A is used instead of the scenario data 123 (FIG. 5A). Like the scenario data 123, the scenario data 123e includes items. Order is associated with the items. The respective items included in the scenario data 123e correspond to motions. The scenario data 123e includes a plurality of items corresponding to procedures of works. The respective items are named "work 1", "work 2", "work 3", and the like. In the example shown in FIG. 8A, data of work procedures in five stages of the work 1 to the work 5 are included. The respective items are associated with contents (work contents) of the items.

In this example, items concerning work for performing an overhaul of a bearing are included. For example, "bearing cleaning" is associated with the work 1 as work content. "Oil seal removal" is associated with the work 2. Targets are set for the items. The target of the work 1 is "bearing". The target of the work 2 is "oil seal".

The setting data 121 includes data of feature values for detecting the targets stored in the scenario data 123e from picked-up image data of the right camera 61 and the left camera 62.

Like the scenario data 123, flags indicating whether the motions of the items have been completed can be set to correspond to the items. When the items corresponding to the items are set, the HMD 100 can use the scenario data 123e as history data.

FIG. 8B shows a configuration example of the display setting data 126 for performing display based on the scenario data 123e. The display setting data 126 is data defining a display form in performing display in the visual field VR of the user according to the scenario data 123e. The display setting data 126 is stored in, for example, the storing section 120. For the targets corresponding to the items included in the scenario data 123e, the display setting data 126 sets a display from in displaying information to allow the user to easily visually recognize the targets. In the example shown in FIG. 8B, when colors are displayed to be superimposed on the items corresponding to the items included in the scenario data 123e, the display setting data 126 associates the colors and a progress situation of work.

The display setting data 126 sets color distinction corresponding to the order of the works. As information for designating the colors, the display setting data 126 may include information for designating specific colors, may include information for designating transmittances of the colors, or may include information for designating luminance. When the colors are grouped into dark colors and light colors, the display setting data 126 may include information for designating groups. The display setting data 126 may include information for designating highlighted display such as a fluorescent color.

In the example shown in FIG. 8B, a light color with low luminance is set to be displayed to be superimposed on a target corresponding to an item before work. The low luminance and the light color have an advantage that the target on which the work is about to be performed is easily seen. A light color is set to be displayed to be superimposed on a target corresponding to an item during work. The light color has an advantage that the light color does not hinder the work under execution. A dark color with high luminance is set to be displayed to be superimposed on a target corresponding to particularly important work. For example, in the scenario data 123e, if flags indicating important works can be set in association with the items, the targets of the important works can be distinguished from the other works using different colors and displayed. A dark color with low luminance is set to be displayed to be superimposed on a target corresponding to an item for which work has been completed. For the target for which the work has been completed, since the end of the work only has to be visually recognized, it is advantageous to set a dark color with low luminance such that the target can be clearly intuitively distinguished by vision from the other targets.

If the display setting data 126 is used, when the user performs work according the scenario data 123e, it is possible to perform colored display for the targets in a state in which the targets are distinguished using colors according to work order. In this case, the user can distinguish, with the colors corresponding to the order of the works, the targets for which the works should be performed and recognize the target. Therefore, even a user unaccustomed to work can perform the work without mistaking a procedure.

A display example in which the scenario data 123e and the display setting data 126 are used is explained. In the following explanation, a plurality of colors can be displayed by the image display section 20. The colors are indicated by hatching in the figure. Note that, naturally, it is also possible to display hatching of predetermined colors to be superimposed on the targets with the image display section 20.

FIGS. 9A, 9B, 9C, and 9D are diagrams showing display examples in the HMD 100 and show the display examples in which AR display is performed using the scenario data 123e and the display setting data 126. FIGS. 9A, 9B, 9C, and 9D show display examples in which an overhaul of a bearing 300 is performed. The bearing 300, which is a target of work is visually recognized in the visual field VR. Reference numeral 301 denotes an outer ring of the bearing 300, 302 denotes an inner ring of the bearing 300, 303 denotes balls, and 304 denotes an oil seal.

Figure 9A:
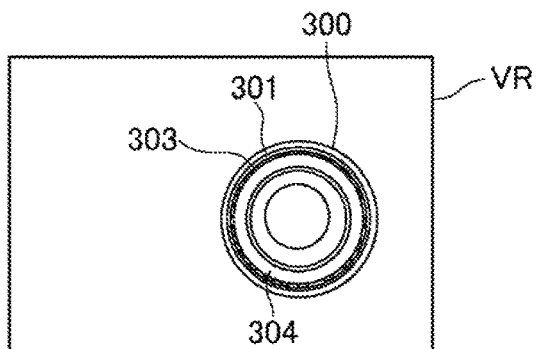
FIG. 9A is a diagram showing a display example in the HMD.

A state before the work is shown in FIG. 9A. The bearing 300 is visually recognized in the visual field VR of the user. The AR-display control section 163 detects the bearing 300, the balls 303 of the bearing 300, and the oil seal 304 as targets on the basis of the scenario data 123e and the setting data 121. Further, the AR-display control section 163 specifies the positions of the bearing 300, the balls 303, and the oil seal 304 in the visual field VR and specifies correspondence between the positions and the display region of the image display section 20.

Figure 9B:
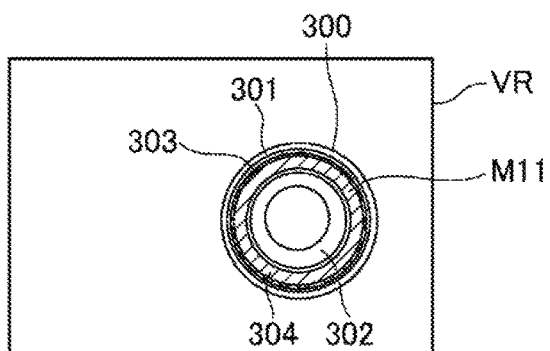
FIG. 9B is a diagram showing a display example in the HMD.

FIG. 9B shows a state in which a predetermined color is displayed to be superimposed on the oil seal 304. A marker M11 of the color is displayed in order of the scenario data 123e and a form set in the display setting data 126 to overlap the oil seal 304. The AR-display control section 163 forms the marker M11 having a frame corresponding to the shape of the target of the AR display. The marker M11 is displayed to be superimposed on the target in a state in which the marker M11 is painted out by a color set in the display setting data 126. Shapes and sizes of the marker M11 and a marker M12 explained below may be determined by the display setting data 126 and the scenario data 123e. For example, when a target of work to be executed next is the oil seal 304, as shown in FIG. 9B, the marker M11 is displayed to be superimposed on the oil seal 304.

Figure 9C:
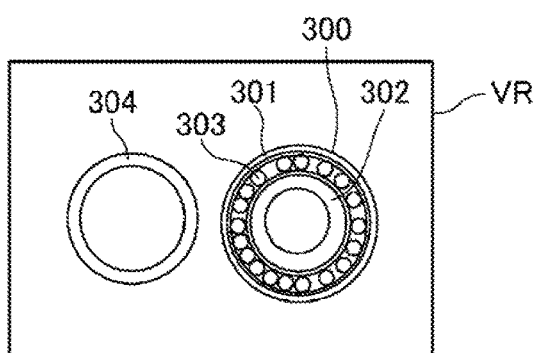
FIG. 9C is a diagram showing a display example in the HMD.

FIG. 9C shows a state after work for detaching the oil seal 304 has been completed. The oil seal 304 and the bearing 300 from which the oil seal 304 is detached are visually recognized.

The AR-display control section 163 performs the AR display of the marker M12 in a position overlapping the balls 303 in order to inform work for removing grease around the balls 303 performed following the work for detaching the oil seal 304. This state is shown in FIG. 9D.

Figure 9D:
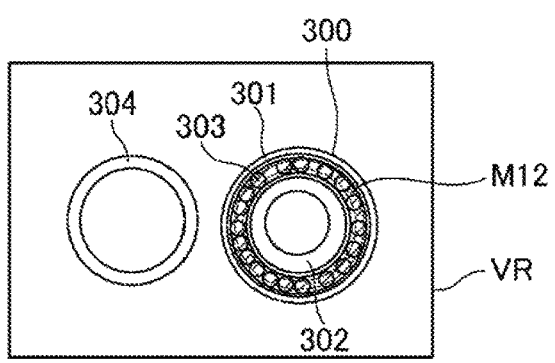
FIG. 9D is a diagram showing a display example in the HMD.

In FIG. 9D, the marker M12 having a ring-like frame is displayed to overlap the balls 303. The marker M12 is painted out in a color designated in the display setting data 126. It is possible to appropriately adjust the visibility of the balls 303 by adjusting the transmittance and the luminance of the color of the marker M12.

In this way, the distinguishing display by colors by AR is performed on the target of the work, which is the object present in the real space, according to the procedure of the work and whether the work has been completed. Consequently, the user can easily distinguish, according to a color, whether the work has been completed or not completed.

FIGS. 10A, 10B, 10C, and 10D are diagrams showing display examples in the HMD 100 and show the display examples in which the AR display is performed using the scenario data 123e and the display setting data 126. FIGS. 10A, 10B, 10C, and 10D respectively show examples in which texts and the like for informing work in addition to the distinguishing display by colors in the examples shown in FIGS. 9A, 9B, 9C, and 9D.

Figure 10A:
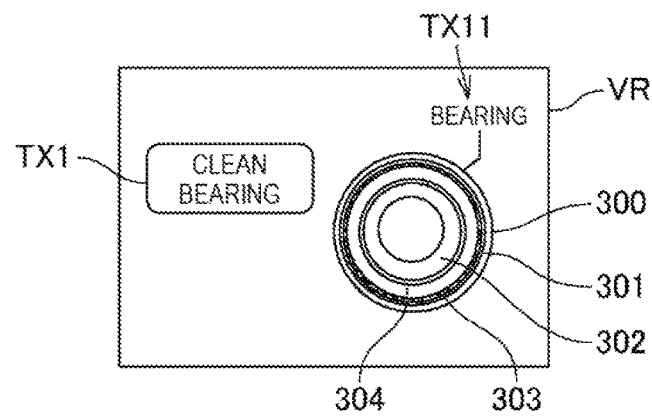
FIG. 10A is a diagram showing a display example in the HMD.

FIG. 10A shows a state before the work 1 of the scenario data 123e (FIG. 8A) is performed. The AR-display control section 163 displays, according to the scenario data 123e, an explanation box TX1 corresponding to the state before the work 1 is performed and including a text for informing content of the work 1. The AR-display control section 163 may display a text indicator TX11 for informing that the bearing 300 is a bearing.

Figure 10B:
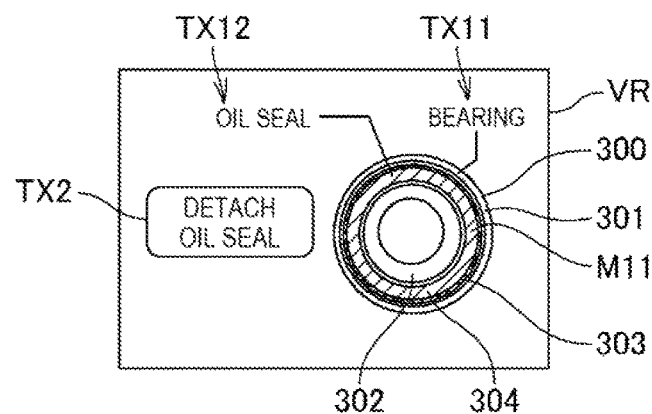
FIG. 10B is a diagram showing a display example in the HMD.

After an input indicating that the work 1 has been completed, the AR-display control section 163 displays an explanation box TX2 corresponding to the work 2 as shown in FIG. 10B. In FIG. 10B, a text indicator TX12 corresponding to the oil seal 304, which is the target of the work 2, is displayed. As explained with reference to FIG. 9B, the AR display of the marker M11 is performed to display the marker M11 to be superimposed on the oil seal 304.

Figure 10C:
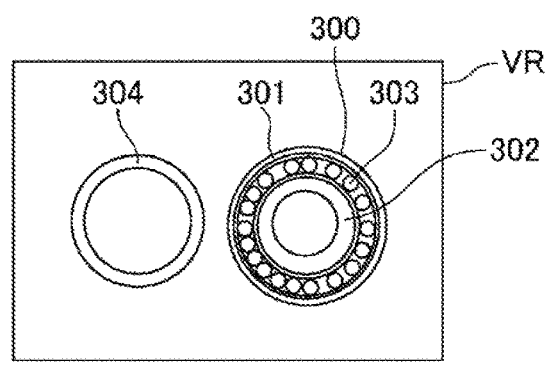
FIG. 10C is a diagram showing a display example in the HMD.

FIG. 10C shows a state after the work for detaching the oil seal 304 has been completed. The oil seal 304 and the bearing 300 from which the oil seal 304 is detached are visually recognized.

The AR-display control section 163 performs display of a marker and the AR display of an explanation box corresponding to the work for removing grease around the balls 303. This state is shown in FIG. 10D.

Figure 10D:
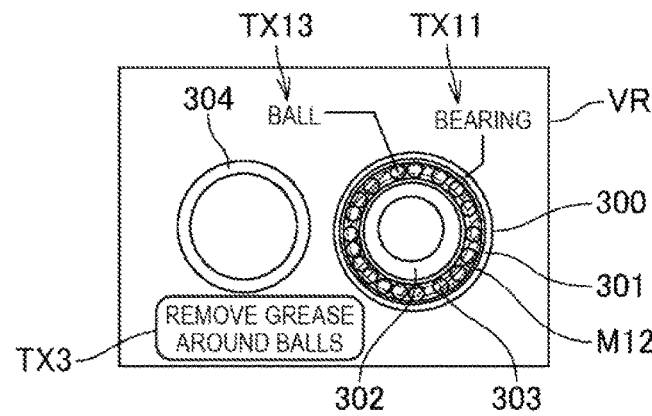
FIG. 10D is a diagram showing a display example in the HMD.

In FIG. 10D, the marker M12 is displayed to be superimposed on the balls 303. An explanation box TX3 for explaining and informing content of the work 3 is displayed. A name of the balls 303 is displayed by a text indicator TX13 with respect to the balls 303, which are the target of the work 3.

For example, contents of texts displayed as the explanation boxes TX1 to TX3 and the text indicators TX11 to TX13 may be included in the scenario data 123e or may be stored in the storing section 120 in association with the items of the scenario data 123e. Content of the AR display performed together with the display of the marker by the AR-display control section 163 is not limited to the text and may be a still image or a moving image. A display color and a display size of the content of the AR display performed together with the display of the marker by the AR-display control section 163 may be set by the AR-display control section 163. Data designating the display color and the display size may be included in the scenario data 123e or the like and stored. For example, a display color of the texts displayed as the explanation boxes TX1 to TX3 and the text indicators TX11 to TX13 may be adjusted to content set as a display form of the marker in the display setting data 126.

In the display examples shown in FIGS. 9A to 10D, the markers M11 to M12 are explained as being distinguished and displayed using the colors set in the display setting data 126. However, the display forms set in the display setting data 126 are not limited to the colors. For example, shapes of hatching may be set. Presence or absence and forms of highlighted display such as flashing and thick-bordered box display may be set.

Figure 11:
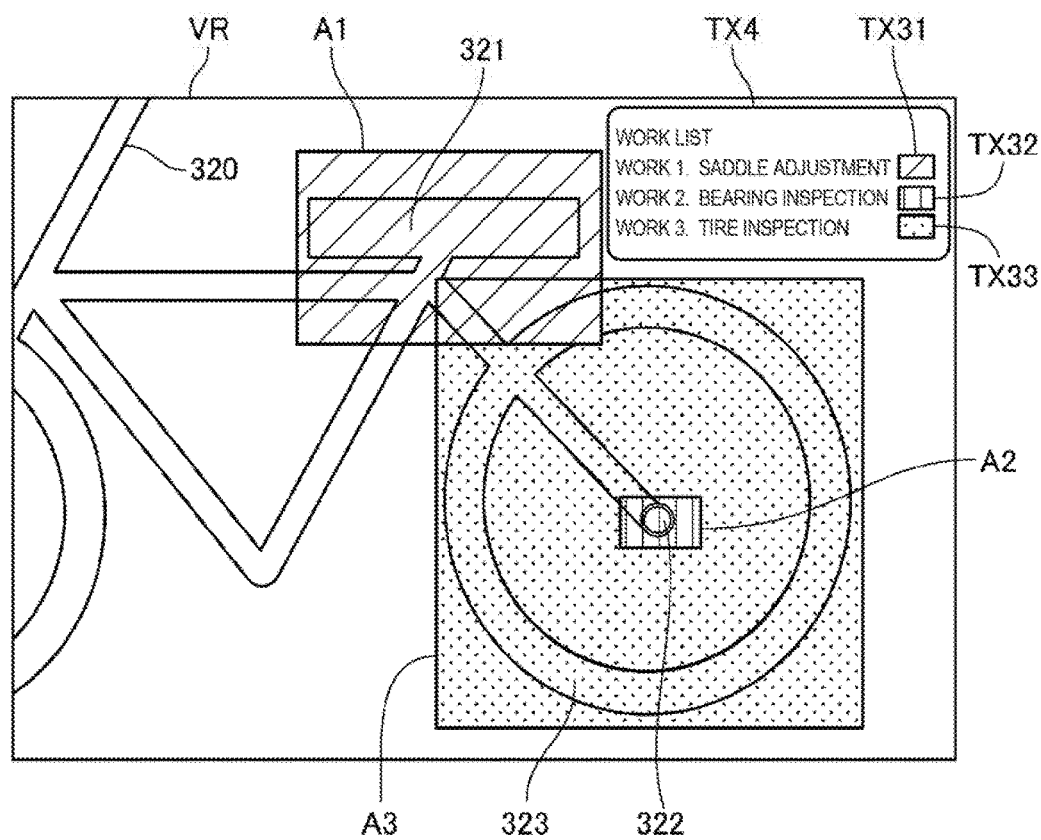
FIG. 11 is a diagram showing a display example in the HMD.

FIG. 11 is a diagram showing a display example in the HMD 100 and is a diagram showing another example of the AR display based on the scenario data 123e.

A bicycle 320, which is a target of work, is visually recognized in the visual field VR. In the bicycle 320, a saddle 321, a hub bearing 322, and a tire 323 are set as targets of works by the scenario data 123e.

In the display example shown in FIG. 11, an explanation box TX4 including texts and the like for informing procedures of a plurality of works is displayed in the visual field VR. Like the list SR shown in FIG. 7A, the explanation box TX4 can also be considered a list of works to be executed. The explanation box TX4 is not limited to the list. For example, the explanation box TX4 may include texts and the like for explaining in detail contents of the respective works to be executed.

In the explanation box TX4, a plurality of works and order of the works are displayed in association with each other. In the explanation box TX4, color display sections TX31 to TX33 indicating display colors of markers corresponding to the respective works are arranged.

In the visual field VR, display regions A1, A2, and A3 are respectively arranged in the saddle 321, the hub bearing 322, and the tire 323, which are the targets of the works in the bicycle 320. The AR-display control section 163 determines the positions of the display regions A1, A2, and A3 according to the positions of the targets. The sizes of the display regions A1, A2, and A3 may be included in the scenario data 123e, the display setting data 126, or other data and stored in the storing section 120. The AR-display control section 163 may set the sizes of the display regions A1, A2, and A3 according to the sizes of the targets.

The display regions A1, A2, and A3 are respectively painted out in display colors corresponding to the works. The colors of the display regions A1, A2, and A3 are set in advance for each of the procedures of the works. For example, the colors of the display regions A1, A2, and A3 may be set according to the execution order of the works and the setting of the display setting data 126 or may be designated in advance in the scenario data 123e. The colors of the display regions A1, A2, and A3 may be hatching or may be highlighted display like the markers M11 to M12 explained above.

In FIG. 11, in the explanation box TX4, a color of the target of the work 1 is displayed in the color display section TX31 corresponding to the work 1. The display region A1 is arranged to be superimposed on the saddle 321, which is the target of the work 1. The display region A1 is painted out in a color same as the color of the color display section TX31. The display region A2 is arranged to be superimposed on the hub bearing 322, which is the target of the work 2. The display region A2 is painted out in a color same as the color of the color display section TX32. The display region A3 is arranged to be superimposed on the tire 323, which is the target of the work 3. The display region A3 is painted out in a color same as the color of the color display section TX33.

In this way, by the AR-display control section 163, in the visual field VR, the regions corresponding to the targets of the works and the regions are distinguished using the colors and displayed according to the order of the works and whether the works have been completed. Consequently, it is possible to clearly inform the user of the order of the works and the work targets.

By highlighting and displaying a detailed procedure (scenario guidance) of actual work with the explanation box TX4, it is possible to provide detailed information concerning a work procedure. The explanation box TX4 may include, for example, concerning the contents of the works 1 to 3, information for informing a method of detaching a cover of a bearing, a method of removing grease and bearing balls, a cleaning method, and the like. More detailed work equivalent to knowhow and not included in ordered items such as check of scratches on a bearing surface and designation of a type of new grease to be applied may be ordered and displayed. In this case, there is an advantage that it is possible to provide detailed information called knowhow and technical information called skill. For example, the AR-display control section 163 may provide information equivalent to the knowhow and the skill with popup display or voice according to operation by the user. In this case, detailed information or technical information required by the user concerning work can be provided in a timely manner.

Figure 12A:
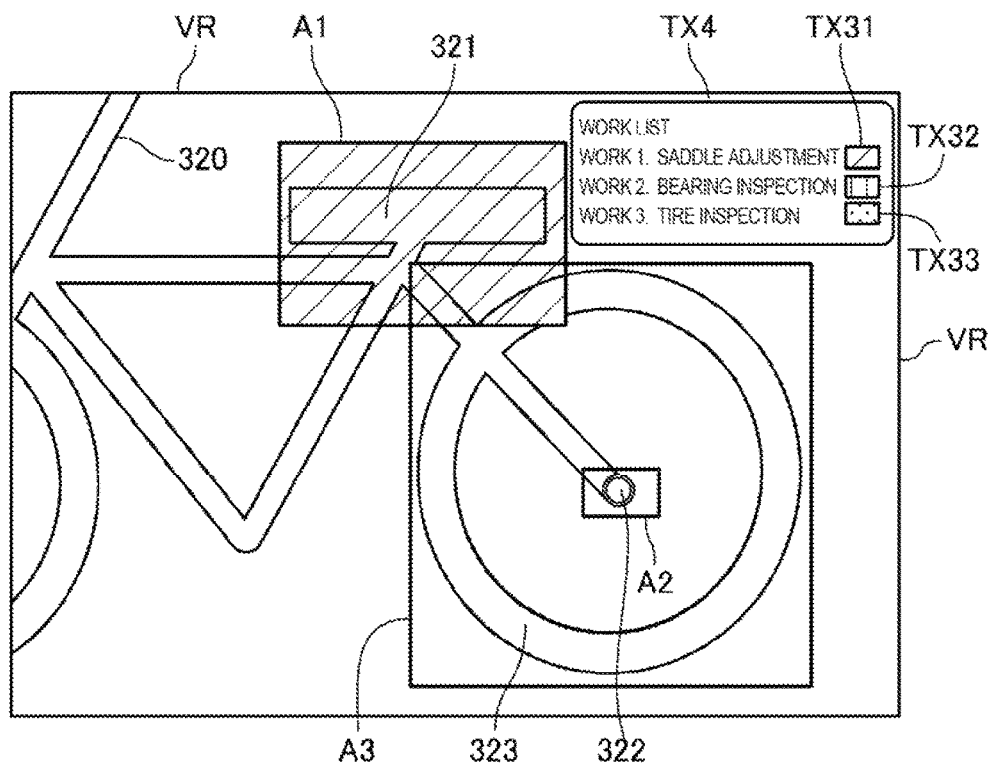
FIG. 12A is a diagram showing a display example in the HMD.
Figure 12B:
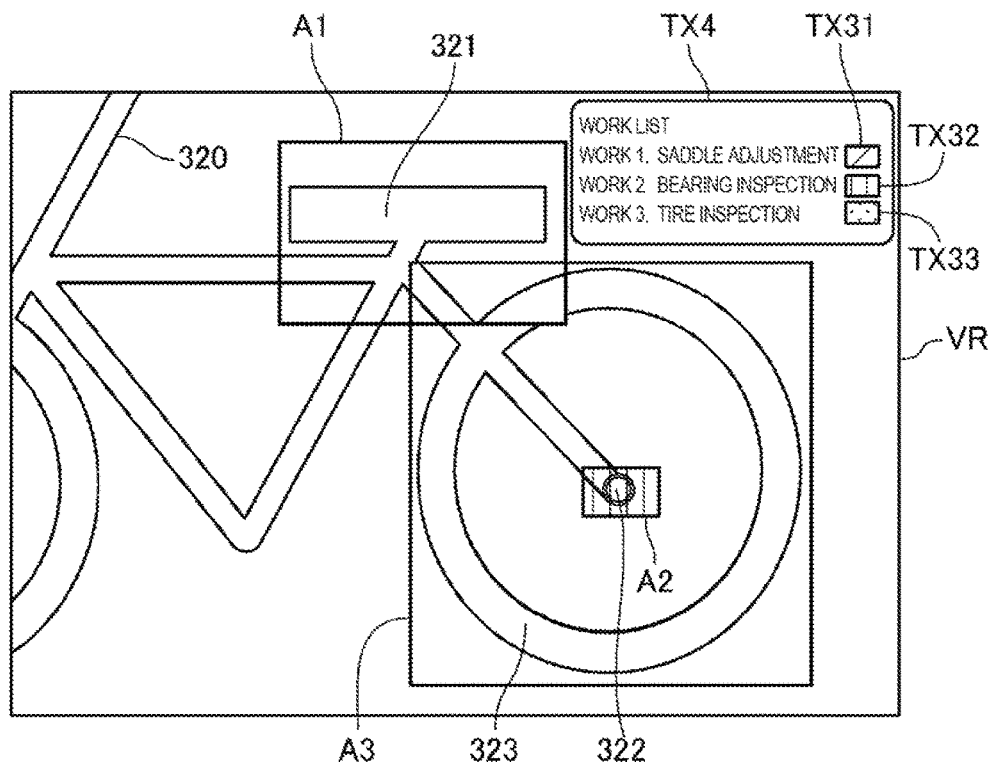
FIG. 12B is a diagram showing a display example in the HMD.

FIGS. 12A and 12B are diagrams showing display examples in the HMD 100, diagrams showing other examples of the AR display based on the scenario data 123e, and modifications of the display shown in FIG. 11. In the examples shown in FIGS. 12A and 12B, the display of the display regions A1 to A3 is changed according to the progress of works.

In the example shown in FIG. 12A, as in FIG. 11, the explanation box TX4 is displayed. In FIG. 12A, the display region A1 overlapping the saddle 321, which is a target of work to be executed next, is displayed in color. The other display regions A2 and A3 are not distinguished and displayed using colors.

According to an input indicating that the work targeting the saddle 321 has been completed, as shown in FIG. 12B, the AR-display control section 163 stops the color display of the display region A1 and displays, in color, the display region A2 overlapping the hub bearing 322, which is a target of work to be executed next.

As shown in FIGS. 12A and 12B, by changing the display of the display regions A1 to A3 according to the progress of the works, a target of work to be executed next is clearly highlighted and displayed. Therefore, according to order of the works, it is possible to highlight the target and cause the user to sense the target.

In this way, by displaying colors to be superimposed on objects or components, which are targets of works, to distinguish the objects or the components through the AR display having augmented reality, it is possible to clearly inform the user of a specific target of work. Consequently, there is an effect that it is easy to associate language information of a work standard and a real object. By changing colors of the display regions before and after execution of the works corresponding to the items of the scenario data 123e, it is possible to use display of the colors instead of a checklist.

The AR-display control section 163 may change, every time work is completed, display states of the items corresponding to the works displayed in the explanation box TX4. For example, concerning completed work, the AR-display control section 163 may change a display color or may reduce a display size to indicate that the work has been completed. The AR-display control section 163 may change a display color such that an item of work to be executed following the completed work can be distinguished from the other items and visually recognized. When the work is completed and the display color is changed, the AR-display control section 163 may set, in the scenario data 123, a time stamp indicating date and time of the completion of the work.

Concerning the display of the explanation box TX4, the AR-display control section 163 may more clearly display display order and importance of motions or a motion set in the scenario data 123 as a motion particularly easily mistaken. Specifically, concerning the display of the explanation box TX4, the AR-display control section 163 may perform highlighted display, enlarged display, a change of a display color, and the like according to the display order or the importance of motions. The AR-display control section 163 may perform the highlighted display, the enlarged display, the change of the display color, and the like concerning the motion particularly easily mistaken. The AR-display control section 163 may shift, not to spoil the visibility of a target of a motion visually recognized through the image display section 20, a display position of the explanation box TX4 from the center of the target. Further, concerning an item set in the scenario data 123 as particularly fine work, the AR-display control section 163 may enlarge and display the item and an image in the explanation box TX4. Further, concerning an item set in the scenario data 123 as complicated work, the AR-display control section 163 may display a moving image in the explanation box TX4 according to, for example, an input of the user.

Figure 13:
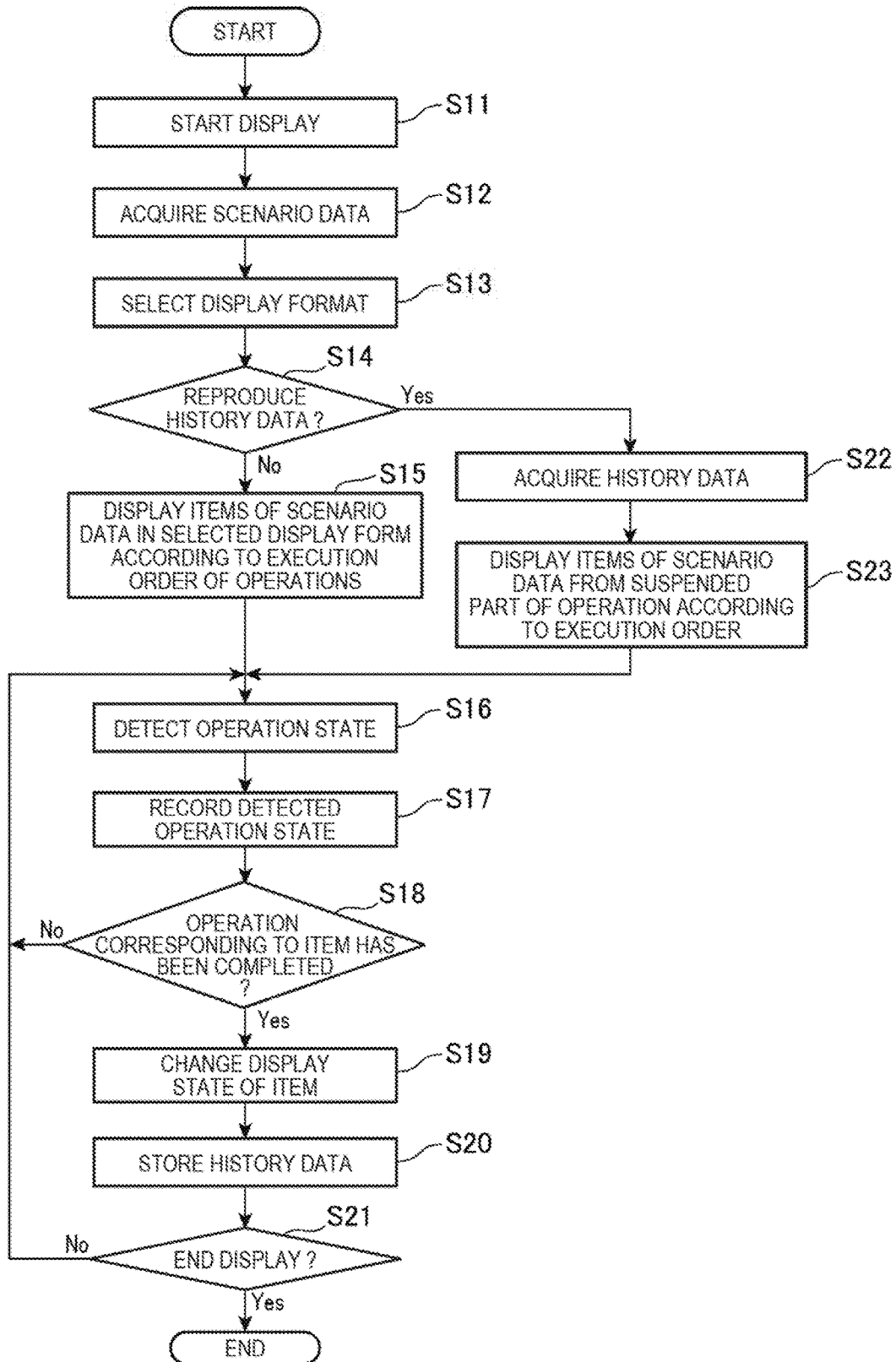
FIG. 13 is a flowchart for explaining the operation of the HMD in the first embodiment.

FIG. 13 is a flowchart for explaining the operation of the HMD 100.

When the user wears the HMD 100 and display of the scenario data 123 is instructed by operation of the operation section 135, the control section 140 starts a motion related to the display (step S11).

The control section 140 acquires the scenario data 123 from the storing section 120 (step S12) and selects a display form of the scenario data 123 (step S12). In step S13, the control section 140 may select a display form set in advance or may select a display form designated by an input of the user. As the display form, there are, for example, the forms shown in FIGS. 7A, 7B, and 7C.

The control section 140 determines whether the history data 124 is used (reproduced) for the display of the scenario data 123 (step S14). If determining according to prior setting or operation by the user that the history data 124 is not reproduced (NO in step S14), the control section 140 causes the image display section 20 to display the items of the scenario data 123 in the display form selected in step S13 (step S15). In step S15, the control section 140 controls display order of the items to match execution order of motions corresponding to the items of the scenario data 123.

Subsequently, the control section 140 detects a motion state on the basis of picked-up image data of the right camera 61 and/or the left camera 62 and input operation by the user (step S16). The control section 140 creates a record of the detected motion state (step S17) and determines whether a motion corresponding to one item has been completed (step S18). If the motion has not been completed (NO in step S18), the control section 140 returns to step S16.

If the motion has been completed (YES in step S18), the control section 140 changes a display state of the item for which the motion is determined as having being completed among the items displayed on the image display section 20 (step S19). The control section 140 stores the history data 124 in the storing section 120 or updates the history data 124 stored in the storing section 120 on the basis of the record created in step S17 (step S20). When the display form selected in step S13 is a display form for sequentially switching and displaying the items one by one or by a number set in advance and motions have been completed for all the displayed items, the control section 140 displays new items.

Thereafter, the control section 140 determines whether to complete the display (step S21). If motions corresponding to all the items included in the scenario data 123 have been completed or an end of the display is instructed by operation by the user, the control section 140 determines to end the display (YES in step S21) and ends the processing.

If determining not to end the display (NO in step S21), the control section 140 returns to step S16.

If determining in step S14 that the history data 124 is reproduced (YES in step S14), the control section 140 acquires the history data 124 (step S22). The control section 140 displays the items included in the scenario data 123 starting from the next item of the item for which the motion is set as having been completed in the history data 124 (step S23) and shifts to step S16.

The state detecting section 164 may detect an execution state on the basis of an input recognized and detected by the position detecting section 162. For example, the state detecting section 164 may detect the execution state on the basis of voice, the position, the direction, or the movement of a pointer, detection values of the nine-axis sensor 66, an image of a marker for input detected from picked-up images of the right camera 61 and/or the left camera 62, and operation of a footswitch (not shown in the figure).

As explained above, the HMD 100 according to the first embodiment applied with the invention includes the image display section 20 that displays an image to be visually recognizable through an outside scene and the position detecting section 162 that detects an input in a range visually recognized through the image display section 20 and specifies an input position. The control section 140 causes the image display section 20 to display an item on the basis of the scenario data 123 including items and changes the display in the image display section 20 according to the input position specified by the position detecting section 162.

Consequently, a person performing a motion (e.g., work) targeting a place or an object can view the item with the image display section 20 and visually recognize the place or the object, which is the target of the motion, through the image display section 20. Therefore, the person does not need to perform a movement with a large load such as a large movement of a visual line in order to view displayed content and can easily view information.

The scenario data 123 includes a plurality of items corresponding to motions. Order of items corresponding to execution order of the motions is set in the respective items. Consequently, the user of the HMD 100 can learn the execution order of the motions on the basis of a display form of the items.

The AR-display control section 163 of the control section 140 may arrange the plurality of items in a list format and cause the image display section 20 to display the items. In this case, the items are arranged according to the order set for the items. Consequently, the user can learn the execution order of the motions from the arrangement of the displayed plurality of items.

The control section 140 may sequentially display the items in the order set for the items. Consequently, the user can learn the execution order of the motions from the display order of the items.

The scenario data 123 includes data including information concerning the execution order of the motions corresponding to the items included in the scenario data 123. The control section 140 causes the image display section 20 to display images such as the list SR and the display section D on the basis of the execution order. Consequently, it is possible to cause the user to visually recognize, with the images, the execution order of the motions.

The AR-display control section 163 displays, in association with the items, the checkboxes CH indicating completion of the motions corresponding to the items. In this case, after causing the image display section 20 to sequentially display an item in the order set for the item, when detecting completion of a motion corresponding to the item, the AR-display control section 163 changes a display state of the checkbox CH to a state indicating the completion of the motion. Consequently, it is possible to clearly show a progress state of the motion.

The HMD 100 stores the scenario data 123 and the order data in the storing section 120 in association with each other. Therefore, it is possible to easily read out and use a correspondence relation between data concerning the items concerning the motions and data concerning the execution order of the motions and the respective data.

The control section 140 may display a marker functioning as an indicator to be superimposed on an item displayed in a position corresponding to the input position specified by the position detecting section 162. In this case, the user can change a display form of the displayed item by performing an input.

The state detecting section 164 of the control section 140 may detect an execution state of a motion corresponding to an item on the basis of picked-up images of an outside scene picked up by the right camera 61 and the left camera 62 or voice collected from the outside scene by the microphone 63. The AR-display control section 163 may change, according to the detected execution state, a display state of an item displayed by the image display section 20. In this case, it is possible to change the display state of the item according to the execution state of the motion.

The storing section 120 stores the history data 124 including information related to execution states of motions. The control section 140 causes the storing section 120 to store, in association with the scenario data 123, the history data 124 of motions corresponding to the items included in the scenario data 123. When the history data 124 is read out from the storing section 120, the control section 140 controls, on the basis of the read-out history data 124, the display state of the item displayed by the image display section 20. In this case, by storing data concerning execution states of motions and reading out the data and reflecting the data on display, it is possible to record the execution states and invoke the recorded execution states.

The control section 140 detects a target in an outside scene with the position detecting section 162. The AR-display control section 163 causes the image display section 20 to display the items included in the scenario data 123 to correspond to a position where the target detected by the position detecting section 162 is visually recognized through the image display section 20. Consequently, it is possible to easily visually recognize both of a place or an object of the target of the motion and an item.

In this way, the HMD 100 can perform the AR display of a check or the like of work performed by a human to be superimposed on an object in a real world or an object of an electronic medium. In this case, by adjusting a form of the display to the position of a target, it is possible to perform stabilizing display for retaining a relative position with respect to the target and retain an item in a position where the item is easily visually recognized.

The control section 140 causes the image display section 20 to display information related to a target selected from an object in a real space visually recognized through the image display section 20 in a display form corresponding to the target. For example, as shown in FIGS. 9A to 12B, the AR-display control section 163 performs the AR display corresponding to the bearing 300, the balls 303, the oil seal 304, the saddle 321, the hub bearing 322, the tire 323, or the like set as a target of work. The AR-display control section 163 performs distinguishing display by colors functioning as information display on the markers M11 and M12 and the display regions A1 to A3. Consequently, it is possible to show information concerning the object in the real space visually recognized through the image display section 20 to the user of the HMD 100 as if the information corresponds to the object in the real world.

The control section 140 causes the image display section 20 to display information for highlighting the target in the real space visually recognized through the image display section 20 to be superimposed on the target. For example, the AR-display control section 163 displays the markers M11 and M12 to be superimposed on the balls 303 and the oil seal 304 set as the targets of the works to highlight the balls 303 and the oil seal 304. For example, the AR-display control section 163 displays the display regions A1 to A3 to respectively superimpose the display regions A1 to A3 on the saddle 321, the hub bearing 322, and the tire 323 set as the targets of the works and highlights the saddle 321, the hub bearing 322, and the tire 323. Consequently, it is possible to highlight an object in the real world related to work and show the object to the user of the HMD 100.

The control section 140 switches, according to an input, information displayed in a display form corresponding to a target to information corresponding to a different target and displays the information. For example, the AR-display control section 163 displays a color as information in the display region A1 displayed to be superimposed on the saddle 321 set as the target of the work. The AR-display control section 163 stops the display of the display region A1 according to an input indicating that the work has been completed and displays a color in the display region A2 displayed to be superimposed on the hub bearing 322. Therefore, it is possible to sequentially display different information according to a different target.

In the embodiment, a method of changing, according to a progress state of work (a motion), a display state of an item displayed by the image display section 20 is not limited to the method of changing a display state of the checkbox CH to a state indicating motion completion in the list SR. For example, an item for which completion of a motion is detected may be deleted from the list SR or a display color or display luminance in the list SR may be changed. For example, a display color of an item may be maintained and a color for improving visibility such as a fluorescent color may be painted out in a position overlapping the item. When the display color of the item is changed, the transmittance of an outside scene in the position overlapping the item may be changed by adjusting the display luminance. A display position of the item may be changed. For example, the item for which the work has been completed may be moved to a different row. Further, an item may be displayed on one of the left optical-image display section 28 and the right optical-image display section 26. A display position of the item for which the work has been completed may be moved from the left optical-image display section 28 to the right optical-image display section 26 or in the opposite direction. Consequently, it is possible to adopt various "display change" forms as long as a procedure that has to be performed is clearly understand in display, although the procedure can be checked afterward.

Application examples of the HMD 100 in the first embodiment include examples explained below.

When a standard operation manual of work including a plurality of processes is formed by the scenario data 123, the scenario data 123 can be used as a checklist. In this case, documents, still images, and moving images for informing the work can be included in the scenario data 123. Voice may be included in the moving images and included in the scenario data 123.

In the standard operation manual, components, apparatuses, or parts of the components or the apparatus set as work targets can be displayed for each of processes of work as the target objects OB by the AR-display control section 163.

The scenario data 123 may be able to be edited on the basis of operation by the user during display based on the scenario data 123. As an input method in this case, the method explained with reference to FIGS. 5A and 5B can be adopted.

In this example, the user can wear the HMD 100, actually perform work, and reflect a change of the work, a changed point of a gist annotation, and the like on the scenario data 123 on a real time basis.

Moving images or still images picked up by the right camera 61 and the left camera 62 and voice collected by the microphone 63 during the work may be able to be included in the scenario data 123 and stored.

Examples of the work include line work in a factory and work in a cell production system. However, the invention can also be applied to support of work in a shop or the like. By enabling the scenario data 123 to be edited, it is possible to register and store, as standard work, an image that could be the standard work while performing the work.

A process of inventory management of shelf merchandise in a small shop or the like can be performed according to the scenario data 123. In this case, the user wearing the HMD 100 can detect commodities with the position detecting section 162 by making a tour of inspection in the store and picking up images of the commodities with the right camera 61 and the left camera 62. In this case, the number and the places of commodities, time, and the like can be recorded and stored as the history data 124. Consequently, the HMD 100 can also be used as a work supporting system for an inventory management job, a picking job, and the like.

In a diagnostic job in a hospital or a clinic, a diagnosis flow can be created and utilized as the scenario data 123. For example, check items in an interview with a patient and items of a test result are included as the items of the scenario data 123, whereby a diagnosis can be performed according to the scenario data 123. In this case, data input by medical personnel such as a doctor, who is a user, concerning the items included in the scenario data 123 and picked-up image data of the right camera 61 and the left camera 62 only have to be stored and saved in the storing section 120 as the history data 124. In this configuration, the history data 124 can be utilized as a part of an electronic clinical record, that is, a diagnosis record.

The invention can also be applied when the user wearing the HMD 100 counts the number of people or objects in a real space visually recognized as an outside scene. In this case, it is effective that, every time input operation such as a gesture is performed, the counting advances and the AR display in which an image or a marker indicating that the counting has been performed overlaps the counted people or objects is performed. In this application example, it is possible to obtain effects that, for example, double count is prevented and a check (count) can be thoroughly performed, although the HMD 100 is operated in a hands-free manner. For example, the HMD 100 can be applied to, for example, count of the number of people in an invent venue and count of the number of components during factory work.

The invention can also be applied when the user wearing the HMD 100 is a referee or a scorer of a ballgame. In this case, when a game is performed in a real space that can be visually recognized as an outside scene, count can be executed concerning plays during the game. Specifically, it is possible to prevent mistakes by performing count of strikes and balls count and display of an inning number, the first half and the second half of an inning, scores, and the like in a game of baseball. For example, it is possible to use the HMD 100 for count of the number of rounds, calculation of scores, and the like in a golf competition and prevent mistakes. A player may wear the HMD 100.

In this way, by applying the invention using the HMD 100, it is possible to guarantee accuracy of a motion of the user and realize a check of a procedure, a check of the number of points, and a check, compensation, and the like for traceability for quality guarantee in a manufacturing site. For example, it is possible to surely prevent, with the functions of the HMD 100, mistakes, troubles, and the like due to uncertainty of a behavior, vagueness of memory, and the like of a human.

The scenario data 123 can be, for example, a presentation project file created in a form of presentation software (e.g., PowerPoint (registered trademark) of Microsoft (registered trademark) Corporation). In this case, the presentation project file is displayed as the scenario data 123. The user wearing the HMD 100 can perform presentation while viewing display in the display region V1. When sentences to be spoken in the presentation are included in the scenario data 123 as contents of items, the scenario data 123 can be used as a manuscript of the presentation. In this case, voice uttered by the user is collected by the microphone 63, converted into a text with the sound processing section 187, and collated with the contents of the scenario data 123. Then, the control section 140 can specify a spoken text (characters or character strings) in the scenario data 123. If the AR-display control section 163 changes a display form of the spoken text, it is possible show a progress state of the presentation to the user. For example, a form is conceivable in which the spoken text is erased from the display region V1. In this case, a display position and display luminance of an image or a text are desirably set to a position and luminance that do not hinder the visibility of an outside scene visually recognized through the image display section 20. Consequently, for example, the user can easily visually recognize slide images of the presentation displayed by a projector. A text or the like to be spoken may be, for example, highlighted.

When an operator performs work while looking at, for example, a manual of a procedure of the work, a check concerning to which part the work has been executed and whether the work has been executed in a correct procedure depends on memory of the operator. Similarly, when a person executes presentation, it is not easy to record to which part the presentation advances. The management of the recording depends on memory of the person executing the presentation. If the HMD 100 in this embodiment is used, the user wearing the HMD 100 can check work content by himself or herself using a checklist. When a motion is detected on the basis of picked-up image data, it is possible to easily and surely perform a motion such as work corresponding to an item included in the scenario data 123 compared with when a check concerning whether the motion has been carried out, a check of a progress state, and the like depends only on memory of the user. It is possible to prevent execution omission of a motion, a mistake of execution order of the motion, and the like. Even if another motion is performed while the series of motions included in the scenario data 123 are sequentially performed, it is possible to obtain information concerning a suspended motion with the list SR and the display section D displayed by the AR-display control section 163. Consequently, it is possible to improve accuracy of work, presentation, or the like including a plurality of processes and achieve improvement in various aspects such as speed, accuracy, and management of time.

Second Embodiment

Figure 14:
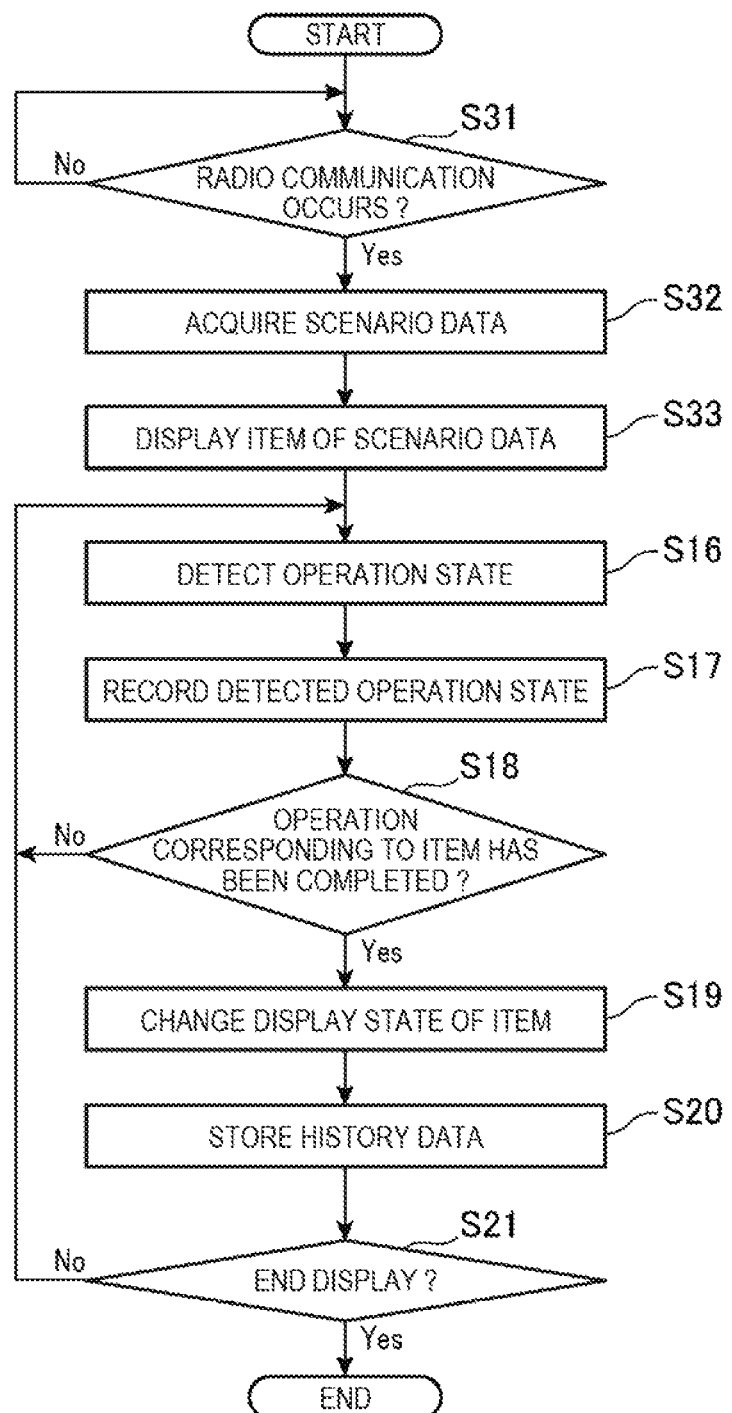
FIG. 14 is a flowchart for explaining the operation of an HMD in a second embodiment.

FIG. 14 is a flowchart for explaining the operation of the HMD 100 in a second embodiment.

The configuration of the HMD 100 in the second embodiment is common to the configuration explained with reference to FIGS. 1 to 4 in the first embodiment. Therefore, illustration and explanation of the configuration are omitted.

In the second embodiment, the HMD 100 acquires the scenario data 123 with the near-field-radio communication section 119. The HMD 100 may acquire the history data 124 together with the scenario data 123.

In the flowchart of FIG. 14, the same step numbers are added to processing common to the operation explained with reference to FIG. 13.

In the operation shown in FIG. 14, the near-field-radio communication section 119 stands by for communication according to control by the communication control section 165 (step S31). In step S31, the near-field-radio communication section 119 attempts communication to an external apparatus. Specifically, the near-field-radio communication section 119 attempts, for example, transmission of a radio signal for performing a search of the external apparatus and reception of a radio signal transmitted from the external apparatus. The external apparatus is, for example, an apparatus, an IC tag, or the like that performs communication through Bluetooth or NFC. The communication control section 165 continues the attempt of the communication until the near-field-radio communication section 119 becomes capable of starting the radio communication with the external apparatus (NO in step S31). If the communication by the near-field-radio communication section 119 has become possible (YES in step S31), the communication control section 165 causes the near-field-radio communication section 119 to execute the radio communication with the external apparatus and acquires the scenario data 123 (step S32). In step S32, the communication control section 165 may acquire the history data 124. The scenario data 123 or the scenario data 123 and the history data 124 acquired by the communication control section 165 are stored in the storing section 120.

The AR-display control section 163 reads out the scenario data 123 acquired by the communication control section 165 and stored in the storing section 120 and displays an item included in the scenario data 123 (step S33). Concerning the display of the item, processing same as steps S14, S15, and S23 of FIG. 13 is performed. The control section 140 executes the operation in steps S16 to S21.

The near-field-radio communication section 119 executes the near field radio communication as explained above. Therefore, when an external apparatus is absent in a range in which the near-field-radio communication section 119 is capable of performing communication, the communication control section 165 does not acquire the scenario data 123. When an external apparatus appears in the communicable range of the near-field-radio communication section 119, the communication control section 165 acquires the scenario data 123 from the apparatus and displays the scenario data 123.

For example, when the control device 10 of the HMD 100 is brought close to the apparatus that retains the scenario data 123, radio communication occurs in step S31 (YES in step S31). An item included in the scenario data 123 acquired from the apparatus is displayed by the image display section 20.

When the HMD 100 in the second embodiment has approached the apparatus that retains the scenario data 123, the HMD 100 performs display based on the scenario data 123 retained by the apparatus that the HMD 100 has approached. In a place where a plurality of apparatuses that retain the scenario data 123 are present, the HMD 100 performs display based on the scenario data 123 retained by the apparatus that the HMD 100 has approached. In this case, the HMD 100 can acquire the scenario data 123 corresponding to the place and perform display.

As a specific example, the apparatus communicable with the HMD 100 and having the scenario data 123 is disposed in a place of furniture such as a desk, utensils, or equipment in a building, a household electric appliance such as a refrigerator, a machine or a production line configured by a plurality of machines in a factory, an automobile, or the like. In this case, when the user wearing the HMD 100 approaches the apparatus having the scenario data 123, display based on the scenario data 123 is performed. Therefore, it is possible to provide the user with the scenario data 123 corresponding to a place where the user is present. If the scenario data 123 is configured to be modifiable by operation by the user, the scenario data 123 can be modified at any time. The modified scenario data 123 may be transmitted to the external apparatus.

As explained above, the HMD 100 may include the communication section 117 that communicates with an external apparatus and the near-field-radio communication section 119 and receive the scenario data 123 from the external apparatus. In this case, it is possible to acquire data concerning items from the outside. The near-field-radio communication section 119 may execute the near field radio communication and acquire the scenario data 123. In this case, since a distance in which the near field radio communication can be performed is limited, it is possible to acquire data associated with a place.

Modifications

A system including a plurality of the HMDs 100 explained in the first and second embodiments can also be configured. In this case, as an example, there is a form in which an administrator who administers motions and an executor who executes motions respectively wear the HMDs 100.

In this configuration, the HMD 100 of the administrator and the HMD 100 of the executor can share the scenario data 123 and the history data 124 by transmitting and receiving the scenario data 123 and the history data 124 between the HMDs 100. That is, the HMD 100 of the executor transmits the scenario data 123 and the history data 124 to the HMD 100 of the administrator. The HMD 100 of the administrator performs display based on the scenario data 123 and the history data 124 received by the HMD 100. Consequently, the administrator can learn an execution state of a motion of the executor.

A configuration may also be adopted in which the HMD 100 of the administrator edits the scenario data 123 and transmits the scenario data 123 after the editing to the HMD 100 of the executor and the HMD 100 of the executor performs display based on the scenario data 123 after the editing. In this case, the administrator can support the executor by editing the scenario data 123 to support execution of a motion of the executor. In this configuration, the administrator can be considered an information providing side, that is, an information provider and the executor can be considered an information receiver.

A plurality of different scenario data 123 may be associated with one another. For example, the scenario data 123 for the administrator and the scenario data 123 for the executor can be associated with each other. The scenario data 123 for the administrator and the scenario data 123 for the executor may be different data. When an item checked by the administrator and an item checked by the executor are different, the scenario data 123 for the administrator and the scenario data 123 for the executor only have to include different items. The HMD 100 only has to retain the history data 124 corresponding to the respective items.

In this case, concerning work executed by the executor, the HMDs 100 respectively worn by the administrator and the executor can check an execution state of a motion and generate the history data 124. Consequently, it is possible to perform a double check concerning the execution of the motion. It is possible to achieve improvement of execution accuracy of the motion.

Note that the invention is not limited to the configurations of the embodiments and can be carried out in various forms without departing from the spirit of the invention.

In the embodiments, the configuration in which the user visually recognizes the outside scene through the display section is not limited to the configuration in which the right optical-image display section 26 and the left optical-image display section 28 transmit the external light. For example, the invention can also be applied to a display device that displays an image in a state in which the outside scene cannot be visually recognized. Specifically, the invention can be applied to a display device that displays, for example, picked-up images of the right camera 61 and/or the left camera 62, an image and a CG generated on the basis of the picked-up images, and a video based on video data stored in advance or video data input from the outside. The display device of this type includes a display device of a so-called closed type with which an outside scene cannot be visually recognized. Naturally, a display device that displays video data or an analog video signal input from the outside without performing processing such as AR display, MR display, or VR display is included as an application target according to the invention.

For example, instead of the image display section 20, an image display section of another type such as an image display section worn like a cap may be adopted. The image display section only has to include a display section that displays an image corresponding to the left eye of the user and a display section that displays an image corresponding to the right eye of the user. The display device according to the invention may be configured as, for example, a head mounted display mounted on a vehicle such as an automobile or an airplane. For example, the display device may be configured as a head mounted display incorporated in a body protector such as a helmet. In this case, a portion for positioning a position with respect to the body of the user and a portion positioned with respect to the portion can be set as a wearing section.

Further, in the embodiments, in the configuration explained as the example, the image display section 20 and the control device 10 are separated and connected via the connecting section 40. However, a configuration can also be adopted in which the control device 10 and the image display section 20 are integrated and worn on the head of the user.

As the control device 10, a notebook computer, a tablet computer, or a desktop computer may be used. As the control device 10, portable electronic apparatuses including a game machine, a cellular phone, a smart phone, and a portable media player, other dedicated devices, and the like may be used. A configuration may be adopted in which the control device 10 and the image display section 20 are separated and the control device 10 and the image display section 20 transmit and receive various signals each other through radio communication.

For example, as the component that generates image light in the image display section 20, the image display section 20 may include an organic EL (Electro-Luminescence) display and an organic EL control section. As the component that generates image light, an LCOS (Liquid Crystal on Silicon: LCoS is a registered trademark), a digital micro mirror device, or the like can also be used.

The "display section" in the invention is equivalent to a component that emits image light. In the following explanation, the HMD 100 emitting the image light is referred to as "display".

In the embodiments, the left and right image-light generating sections explained with reference to FIG. 4 generate image lights and the right optical-image display section 26 and the left optical-image display section 28 shown in FIG. 2 radiate the image lights respectively toward the right eye and the left eye of the user. Consequently, the right optical-image display section 26 and the left optical-image display section 28 respectively make the image light incident on the right eye and the left eye of the user. The configuration of the "display section" is not limited to this. That is, the configuration of the "display section" is not limited to the configurations shown in FIGS. 2 and 4 as long as the display section radiates image light. For example, in the configuration in the embodiments, image lights are emitted toward the eyes of the user by the "right light guide section" and the "left light guide section" including the half mirrors 261A and 262A. As components that generate image lights, the HMD 100 includes the right backlight 221 and the left backlight 222 and the right LCD 241 and the left LCD 242. The "display section" does not require these components.

For example, image lights generated by a mechanism incorporated in one or both of the right display driving section 22 and the left display driving section 24 of the image display section 20 may be reflected by a reflection mechanism provided on the user side of the image display section 20, that is, a side facing the eyes of the user and emitted to the eyes of the user. As the reflection mechanism, a scanning optical system including a MEMS (Micro Electro Mechanical Systems) mirror can be adopted. That is, the image display section 20 may include scanning optical systems including MEMS mirrors that scan lights emitted by the image-light generating sections. The lights scanned by the scanning optical systems may be directly made incident on the eyes of the user. Optical members on which virtual images are formed by the lights scanned by the scanning optical systems may be provided in the image display section 20. The optical members form virtual images by the scanning lights scanned by the MEMS mirrors. In this case, the MEMS mirrors scan lights, whereby virtual images are formed on virtual image forming surfaces. The user catches the virtual images with both the eyes to visually recognize (recognize) an image. Optical components in this case may be optical components that guide lights through a plurality of times of reflection like, for example, the right light guide plate 261 and the left light guide plate 262 in the embodiments. Half mirror surfaces may be used as the optical components.

The scanning optical systems are not limited to the configuration including the MEMS mirrors. The mechanisms that generate image lights may be laser beam sources that emit laser beams. For example, it is also possible to apply the invention to a head mounted display of a laser retinal projection type. That is, a configuration may be adopted in which light emitting sections include laser beam sources and optical systems for guiding laser beams to the eyes of the user, make the laser beams incident on the eyes of the user to scan the retina, and form images on the retina to thereby cause the user to visually recognize an image.

Instead of the virtual image forming surfaces that receive the scanned lights, components that guide the image lights to the eyes of the user using diffraction gratings may be adopted. That is, the components are not limited to components that guide the image lights inside the optical members and may be components including only a function of refracting and/or reflecting the image lights toward the eyes of the user.

In the configuration including the scanning optical systems including the MEMSs or the like, it is possible changes a position where the user visually recognizes an image, that is, a display position of the image by changing an attachment angle of the scanning optical systems in the image display section 20. Therefore, in the processing for changing the display position in the embodiments, a motion for changing the angle of the scanning optical systems may be performed instead of the motion for changing the display positions of the images in the right LCD 241 and the left LCD 242.

As the optical systems that guide the image lights to the eyes of the user, it is possible to adopt components including optical members that transmit external light made incident toward the device from the outside. The components make the external light incident on the eyes of the user together with the image lights. Optical members located in front of the eyes of the user and overlapping a part of or the entire visual field of the user may be used.

In the embodiments, the configuration is illustrated in which virtual images are formed by the half mirrors 261A and 262A on parts of the right optical-image display section 26 and the left optical-image display section 28 located in front of the eyes of the user. The invention is not limited to this. Images may be displayed in the display regions having areas occupying the entire or most of the right optical-image display section 26 and the left optical-image display section 28. In this case, processing for reducing the image may be included in the motion for changing the display position of the image.

Further, the optical elements according to the invention are not limited to the right light guide plate 261 and the left light guide plate 262 including the half mirrors 261A and 262A and only have to be optical components that make image lights incident on the eyes of the user. Specifically, a diffraction grating, a prism, or a holography display section may be used.

At least a part of the functional blocks shown in FIG. 4 may be realized by hardware or may be realized by cooperation of the hardware and software. The invention is not limited to the configuration in which the independent hardware resources are disposed as shown in FIG. 4. The computer program executed by the control section 140 may be stored in the storing section 120 or a storage device in the control device 10. Alternatively, the control section 140 may be configured to acquire the computer program stored in an external device via the communication section 117, the near-field-radio communication section 119, or the interface 125 and execute the computer program. Among the components formed in the control device 10, only the operation section 135 may be formed as an independent user interface (UI). The components formed in the control device 10 may be redundantly formed in the image display section 20. For example, the control section 140 shown in FIG. 4 may be formed in both of the control device 10 and the image display section 20. The functions performed by the control section 140 formed in the control device 10 and the CPU formed in the image display section 20 may be separated.

The entire disclosure of Japanese Patent Application Nos. 2015-135738, filed Jul. 7, 2015 and 2016-013249, filed Jan. 27, 2016 are expressly incorporated by reference herein.

What is claimed is:

1. A head-mounted display device comprising:
a memory that stores scenario data including work list images associated with target objects set for items; a head-mounted display configured to electronically display imagery while enabling visual recognition of real world outside scenery; and a processor or circuit configured to: receive, from a camera, a plurality of images of the real world outside scenery that are captured by the camera; and while receiving the plurality of images of the real world outside scenery that are captured by the camera: detect a target object from one of the captured images of the real world outside scenery; control the head-mounted display to display, based on the detected target object, a work list image, from among the stored work list images, that includes two or more items that are displayed according to a work scenario associated with the detected target object; perform recognition on a group of the received captured images of the real world outside scenery so as to recognize a pointer; determine a user input corresponding to a gesture associated with the work list image, based on the pointer recognized in the captured images; and control the display to change a display state of the displayed work list image to indicate that the gesture includes been completed, after recognizing the user input that is the gesture, wherein the processor or circuit is further configured to: control, on the basis of item data including an item, the head-mounted display to display the two or more items, wherein the item data includes the two or more items, which correspond to motions, and an order of the items corresponding to an execution order of the motions is set in the displayed work list image, wherein the processor or circuit is further configured to: control the head-mounted display to sequentially display the two or more items in the order set for the two or more items, and wherein the processor or circuit is further configured to: control the head-mounted display to display, in association with each of the two or more items, checkboxes that each indicating completion of the motion corresponding to the respective item, and control the head-mounted display to, after sequentially displaying the two or more items in the order set for the two or more items, when detecting the completion of the motion corresponding to one of the two or more items, change a display state of the checkbox corresponding to the one of the two or more items to a state indicating completion of the motion corresponding to the one of the two or more items.

2. The head-mounted display device according to claim 1, wherein the processor or circuit is further configured to: control the head-mounted display to display the work list image on the basis of order data including information concerning the execution order of the motions corresponding to the two or more items included in the item data.

3. The head-mounted display device according to claim 2, wherein the memory further stores the item data and the order data in association with each other.

4. The head-mounted display device according to claim 1, wherein the processor or circuit is further configured to: control the head-mounted display to display information related to the target object in a display form corresponding to the target object.

5. The head-mounted display device according to claim 4, wherein the processor or circuit is further configured to: control the head-mounted display to display information for highlighting the target object in the real world outside scenery visually recognized through the head-mounted display superimposed on the target object.

6. The head-mounted display device according to claim 4, wherein the processor or circuit is further configured to: control the head-mounted display to switch, according to recognized input, the information related to the target object that is displayed in the display form corresponding to the target object to information corresponding to another target object that is different from the target object.

7. The head-mounted display device according to claim 1, wherein the processor or circuit is further configured to:
   recognize the user input in a range visually recognized through the head-mounted display, and specify an input position, and
   control the head-mounted display to change the head-mounted display according to the specified input position.

8. The head-mounted display device according to claim 7, wherein the processor or circuit is further configured to: control the head-mounted display to display an indicator superimposed in a position corresponding to the specified input position.

9. The head-mounted display device according to claim 1, wherein the processor or circuit is further configured to:
   detect an execution state of a motion corresponding to one of the two or more items on the basis of the captured images or a voice collected from the real world outside scenery, and
   change, according to the detected execution state, a display state of the one of the two or more items, which is being displayed by the head-mounted display.

10. The head-mounted display device according to claim 9, wherein the memory stores execution data including information related to execution states of motions, and
   the processor or circuit is further configured to:
      cause the memory to store, in association with item data, execution data of the motion corresponding to the one of the two or more items, and
      when the execution data is read out from the memory, on the basis of the read-out execution data, control the head-mounted display to change the display state of the one of the two or more items, which is displayed by the head-mounted display.

11. The head-mounted display device according to claim 1, wherein the processor or circuit is further configured to:
   control the head-mounted display to display an item included in item data to correspond to a position where the detected target object is visually recognized through the head-mounted display.

12. The head-mounted display device according to claim 1, further comprising a communication interface configured to communicate with an external apparatus, wherein the processor or circuit receives and acquires, via the communication interface, item data from the external apparatus.

13. The head-mounted display device according to claim 12, wherein the communication interface executes near field radio communication.

14. A control method for a head-mounted display control device including a head-mounted display configured to electronically display imagery while enabling visual recognition of real world outside scenery, the control method comprising: receiving, from a camera, a plurality of images of the real world outside scenery that are captured by the camera; and while receiving the plurality of images of the real world outside scenery that are captured by the camera: detecting a target object from one of the captured images of the real world outside scenery; controlling the head-mounted display to display, based on the detected target object, a work list image, from among work list images stored in a memory, that includes two or more items that are displayed according to a work scenario associated with the detected target object; performing recognition on a group of the received captured images of the real world outside scenery so as to recognize a pointer; determining a user input corresponding to a gesture associated with the work list image, based on the pointer recognized in the captured images; and controlling the display to change a display state of the displayed work list image to indicate that the gesture includes been completed, after recognizing the user input that is the gesture, the control method further comprising: controlling, on the basis of item data including an item, the head-mounted display to display the two or more items, wherein the item data includes the two or more items, which correspond to motions, and an order of the items corresponding to an execution order of the motions is set in the displayed work list image, the control method further comprising: controlling the head-mounted display to sequentially display the two or more items in the order set for the two or more items, and the control method further comprising: controlling the head-mounted display to display, in association with each of the two or more items, checkboxes that each indicating completion of the motion corresponding to the respective item, and controlling the head-mounted display to, after sequentially displaying the two or more items in the order set for the two or more items, when detecting the completion of the motion corresponding to one of the two or more items, changing a display state of the checkbox corresponding to the one of the two or more items to a state indicating completion of the motion corresponding to the one of the two or more items.

15. A non-transitory computer-readable medium comprising computer program instructions that, when executed by a processor of a head-mounted display device, cause the head-mounted display device to: receive, from a camera, a plurality of images of the real world outside scenery that are captured by the camera; and while receiving the plurality of images of the real world outside scenery that are captured by the camera: detect a target object from one of the captured images of the real world outside scenery; control the head-mounted display to display, based on the detected target object, a work list image, from among work list images stored in a memory, that includes two or more items that are displayed according to a work scenario associated with the detected target object; perform recognition on a group of the received captured images of the real world outside scenery so as to recognize a pointer; determine a user input corresponding to a gesture associated with the work list image, based on the pointer recognized in the captured images; and control the display to change a display state of the displayed work list image to indicate that the gesture includes been completed, after recognizing the user input that is the gesture, wherein the processor or circuit is further configured to: control, on the basis of item data including an item, the head-mounted display to display the two or more items, wherein the item data includes the two or more items, which correspond to motions, and an order of the items corresponding to an execution order of the motions is set in the displayed work list image, wherein the processor or circuit is further configured to: control the head-mounted display to sequentially display the two or more items in the order set for the two or more items, and wherein the processor or circuit is further configured to: control the head-mounted display to display, in association with each of the two or more items, checkboxes that each indicating completion of the motion corresponding to the respective item, and control the head-mounted display to, after sequentially displaying the two or more items in the order set for the two or more items, when detecting the completion of the motion corresponding to one of the two or more items, change a display state of the checkbox corresponding to the one of the two or more items to a state indicating completion of the motion corresponding to the one of the two or more items.

16. The head-mounted display device according to claim 1, wherein when a task is completed, the work list image changes, but only a portion of the work list image corresponding to the completed task changes, while portions of the work list image corresponding to other uncompleted tasks are unaffected.

17. The head-mounted display device according to claim 1, wherein the processor or circuit is further configured to: control the display to change a display state of an object corresponding to the gesture in the displayed work list image so as to indicate that the gesture has been completed, after recognizing the user input that is the gesture.

18. The head-mounted display device according to claim 1, wherein the processor or circuit is further configured to:
control the display to display, based on scenario data, as the work list image, a work list image having the two or more items that are displayed in order according to the work scenario associated with the detected target object; and
control the display to change a display state of the displayed work list image to indicate that the gesture has been completed.

19. The head-mounted display device according to claim 1, wherein the changing of the display state of the displayed work list image includes at least one of: changing a checkbox in the work list image to a state indicating completion, deleting an item for which completion of the gesture is detected, changing a display color or a display luminance in the work list image, changing a display position of the item for which completion of the gesture is detected, and changing a display size of the work list image for which completion of the gesture is detected.

* * * * *